United States Patent [19]

Henrion et al.

[11] 4,159,516

[45] Jun. 26, 1979

[54] INPUT/OUTPUT CONTROLLER HAVING SELECTABLE TIMING AND MASKABLE INTERRUPT GENERATION

[75] Inventors: W. S. Henrion; Yogendra C. Pandya, both of Houston; Lynn B. King, Missouri City, all of Tex.

[73] Assignee: Texas Instruments Incorporated, Dallas, Tex.

[21] Appl. No.: 669,582

[22] Filed: Mar. 23, 1976

[51] Int. Cl.$^2$ .......................... G06F 3/00; G06F 5/04
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,178,689 | 4/1965 | McKenna | 364/200 |
| 3,286,239 | 11/1966 | Thompson et al. | 364/200 |
| 3,290,658 | 12/1966 | Callahan et al. | 364/200 |
| 3,479,649 | 11/1969 | Bahrs et al. | 364/200 |
| 3,566,368 | 2/1971 | De Blauw | 364/200 |
| 3,828,325 | 8/1974 | Stafford et al. | 364/200 |
| 3,828,327 | 8/1974 | Berglund et al. | 364/200 |
| 3,905,025 | 9/1975 | Davis et al. | 364/200 |
| 3,972,023 | 7/1976 | Bodner et al. | 364/200 |
| 3,979,732 | 9/1976 | Hepworth et al. | 364/200 |
| 3,984,820 | 10/1976 | Stanley et al. | 364/200 |
| 3,999,165 | 12/1976 | Kita et al. | 364/200 |
| 3,999,169 | 12/1976 | Perschy | 364/200 |
| 4,010,448 | 3/1977 | Bennett et al. | 364/200 |
| 4,020,471 | 4/1977 | Woods et al. | 364/200 |
| 4,020,472 | 4/1977 | Bennett et al. | 364/200 |

OTHER PUBLICATIONS

"TMS 5501 Multifunction Input/Output Controller for a TMS 8080 System", published by Texas Instruments, Inc., Dallas, Texas, 1975.
"M6800 Microprocessor Application Manual", pp. 3-1 through 3-38, published by Motorola, Inc., Chicago, Ill., 1975.
M. D. Schettl and D. J. Thomforde, "Centralized Interval Timer and Event Counter" in *IBM Tech. Discl. Bull.*, vol. 17, No. 5, Oct. 1974, pp. 1455-1459.

*Primary Examiner*—Melvin B. Chapnick
*Attorney, Agent, or Firm*—Melvin Sharp; Rene' E. Grossman; Thomas G. Devine

[57] ABSTRACT

An input/output controller provides a numer of adjustable timers for timing events such as for polling external devices and includes circuitry which generates interrupt vector signals upon the occurrence of certain events, including the expiration of time set in the adjustable timers and also upon receipt of signals from the external devices. The interrupt signals may be selectively masked when it is not desirable or practical for an interrupt to occur. The controller is an MOS N-channel device on a single chip and is packaged in a 40 pin package and is compatible with a Model TMS 8080 Microprocessor Unit.

10 Claims, 17 Drawing Figures

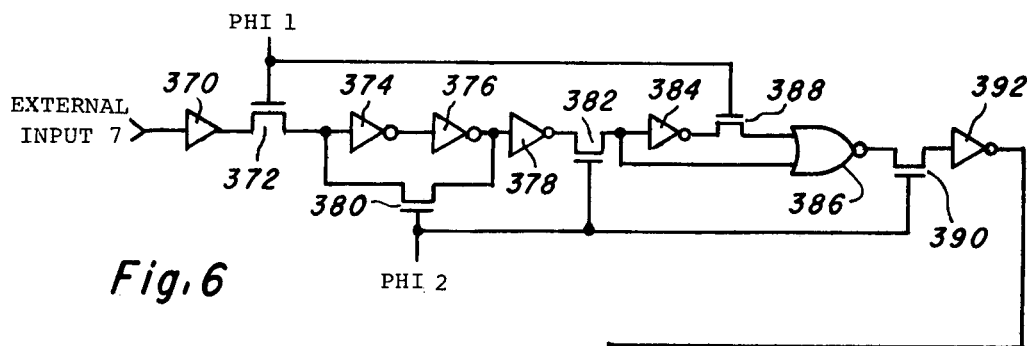
Fig. 6
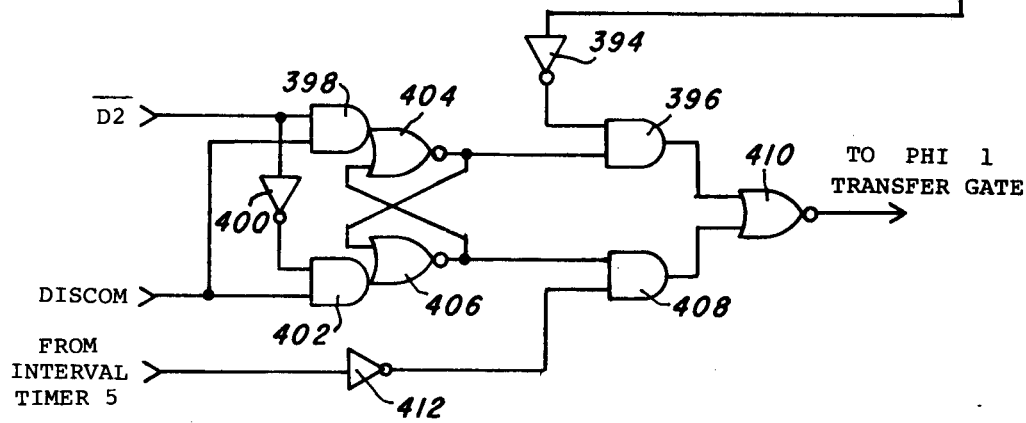
Fig. 14
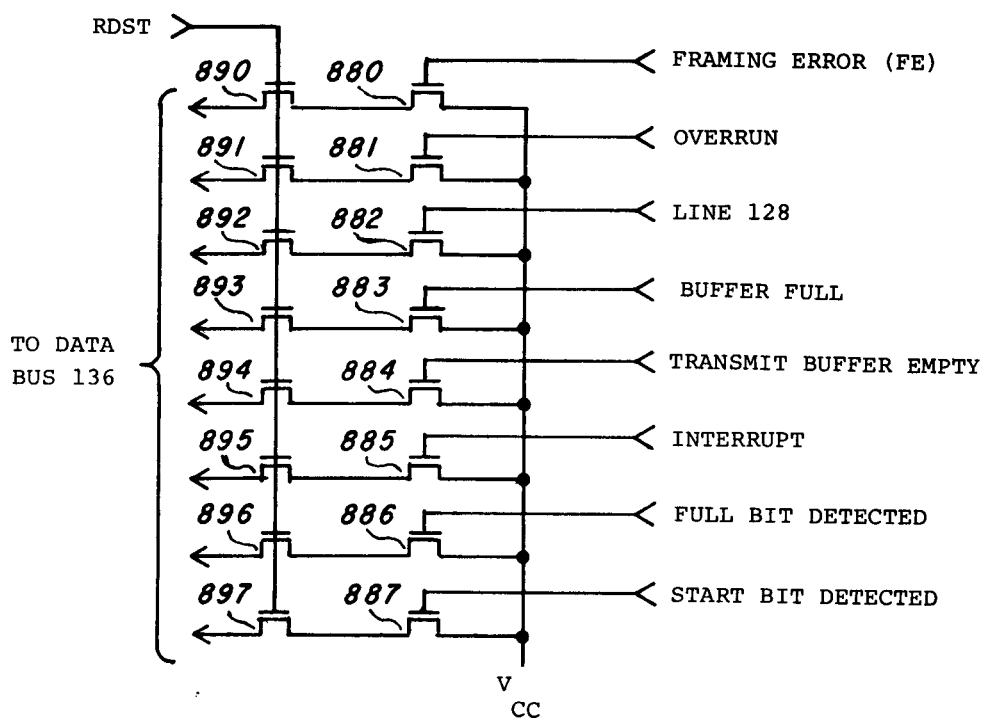

INPUT/OUTPUT CONTROLLER HAVING SELECTABLE TIMING AND MASKABLE INTERRUPT GENERATION

BACKGROUND OF THE INVENTION

1. Field of the Invention

This invention relates to an input/output device for use in conjunction with a microprocessor unit and more specifically to a one chip semiconductor device input/output unit.

2. Description of the Prior Art

Recent advances in the semiconductor art have included the development of a number of LSI semiconductor circuits commonly referred to as microprocessors. One such unit is the Model TMS 8080 microprocessor available from Texas Instruments Incorporated of Dallas, Texas. The TSM 8080 is an eight bit parallel central processing unit fabricated on a single chip using a high speed N-channel silicon gate process. A complete microcomputer system can be formed by interfacing this circuit with any appropriate memory. Microprocessors such as the TMS 8080 provide powerful computational capability at a low cost and in a very small package. They are useful in a wide variety of applications, one class of such applications being as the central controller in any of various types of real time electronic systems.

When utilized in a real time system, however, it is necessary to provide circuits for interfacing the microprocessor with the other hardware units of the system. For example, the TMS 8080 microprocessor has an eight bit parallel bidirectional data bus. It is necessary to provide controlled buffering means for synchronizing the parallel transfer of data words between the microprocessor and other system elements. Further, in many of the systems wherein a microprocessor may find use, certain of the system elements will require that the bits of a data word be transferred in serial rather than in parallel fashion. Accordingly, it is necessary to provide structure for accepting a data word from the parallel data bus and transmitting the bits serially, and for accepting incoming data words serially into a buffer to be ultimately shifted onto the parallel data bus. Preferably the serial data transfer may occur at any of a plurality of selectable baud rates as required by the microprocessor. It is also desirable in many cases to provide the microprocessor with one or more external interval timers. The microprocessor directs an interval timer to begin counting at some point in time and at the expiration of a preselected time interval the timer responds to inform the microprocessor that the time interval has expired. Further, it is necessary to provide means for generating interrupt messages to inform the microprocessor of the existence of certain conditions in the other elements of the system. The expiration of one of the interval timers, for example, may be communicated by means of an interrupt signal. Preferably the various interrupts will be maskable and will be recognized by the microprocessor in accordance with a predetermined priority arrangement.

In the past it has been known to provide one or more of the above-mentioned interface functions by random logic networks typically comprising a large number of TTL intergrated circuits. This type is implementation, however, is undesirable for several reasons. The large number of integrated circuits occupy a large printed circuit board area and prevent the desired miniaturization of the system. Further, the power required by the integrated circuits requires large power supplies, again in conflict with the interest in miniaturization. The design of a custom combination of integrated circuits for each new application requires the dedication of a large amount of engineering time. Further, once designed the system is highly inflexible and not readily amenable to modifications. An important consideration in a system comprised of a plurality of integrated circuits is the large amount of time and effort required to assemble each such system.

There is commercially available an LSI semiconductor device for generating interrupt signals. The interrupts of this device are not maskable. Even if this device is incorporated in a microprocessor controlled system, it would be necessary to provide the plurality of TTL type circuits for the masking function as well as the other previously enumerated functions (synchronized parallel I/O, serial I/O, interval timers).

BRIEF SUMMARY OF THE INVENTION

It is therefore an object of the present invention to provide on a single integrated circuit chip a plurality of the interface functions required by a microprocessor unit.

It is another object of the invention to provide both parallel and serial input/output capabilities for a microprocessor on a single integrated circuit device.

It is a further object of the invention to provide on a single integrated circuit chip both the input/output capabilities and the prioritized interrupt capabilities required by a microprocessor unit.

It is yet another object of the invention to provide in a single device input/output means, interrupt generation means and programmable interval timer means for use in conjunction with a microprocessor.

It is yet a further object of the invention to provide a serial input/output capability on a single integrated circuit device wherein the baud rate is selectable in response to signals from a microprocessor.

Briefly, in the preferred embodiment, the present invention comprises a single chip MOS N-channel input/output controller device. The controller includes an eight bit parallel output register, and eight parallel input lines along with a sensor for generating an interrupt in response to zero to one transitions on one of the eight input lines. Additionally, the controller includes both a serial data receiver and a serial data transmitter. A maskable interrupt register provides means for temporarily storing interrupt signals which have been generated by the controller. The interrupts are read by the associated microprocessor unit in accordance with a predetermined priority arrangement. Five interval timers are available to the microprocessor to time preselected intervals and signify the expiration of these intervals through the generation of appropriate interrupt signals.

Attention is directed to the following two manuals which may be helpful in gaining an understanding of the input/output controller; "TMS 8080 Microprocessor" and "TMS 5501 Multifunction Input/Output Controller for a TMS 8080 System." Both of these manuals which were copyrighted in 1975 are available from Texas Instruments Incorporated of Dallas, Texas and are incorporated herein by reference.

Other objects and features of the invention may be better understood by a consideration of the following detailed description taken in connection with the accompanying drawings wherein:

BRIEF DESCRIPTION OF THE DRAWINGS

FIG. 6 illustrates additional circuit details of the interrupt generation;

FIG. 14 is a schematic diagram of the status register.

DETAILED DESCRIPTION OF THE INVENTION

Figure 1:
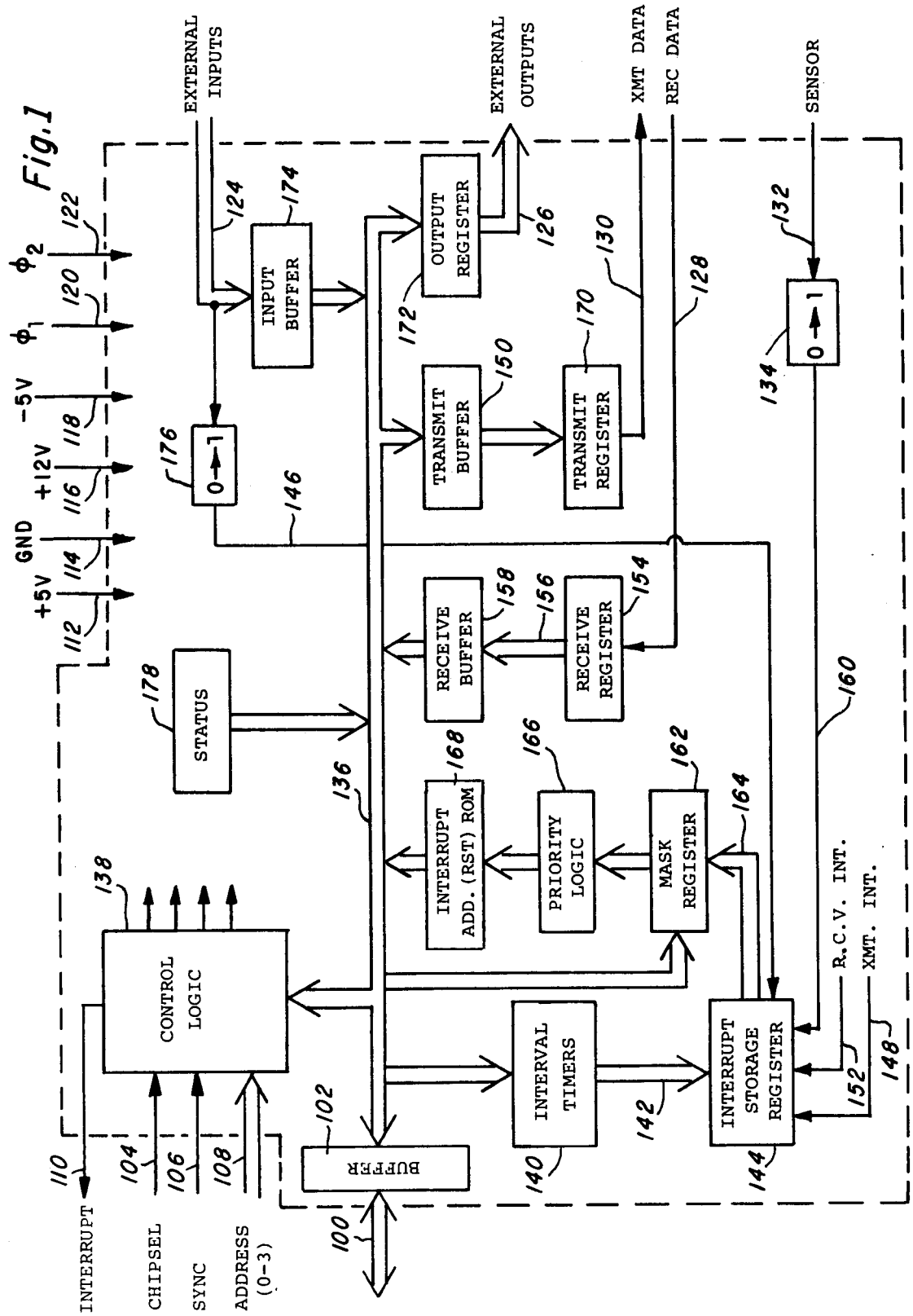
FIG. 1 is a system block diagram of the input/output controller.

FIG. 1 is a block diagram of the input/output controller. The transfer of data words between the controller and a microprocessor occurs on a parallel 8-bit data bus 100. Data bus 100 is coupled to the controller chip by inverting buffer 102. Other signals to the controller chip from the microprocessor include a chip select signal on line 104, a SYNC signal on line 106, and bits 0–3 of the microprocessor address bus on 4-bit bus 108. Interrupt signals from the controller are coupled to the microprocessor by a line 110. The power supply voltages are coupled to the chip supply lines 112, 114, 116 and 118. The two-phase clock signals $\phi_1$ and $\phi_2$ appearing on lines 120 and 122, respectively, are of the type commonly used with a microprocessor such as the TMS 8080. In the preferred embodiment of the invention, the frequency of the clock is two megahertz.

Parallel 8-bit data words from external devices are coupled to the chip by 8-bit bus 124. A corresponding parallel 8-bit output bus 126 couples data words to external devices. Serial data from external devices is coupled to the chip by line 128. Serial output data appears on line 130 for transmission to external devices. A final input to the chip, appearing on line 132, is a sensor signal. As indicated symbolically by block 134, the sensor signal is monitored continuously for 0 to 1 transitions, such transitions serving to initiate the generation of an interrupt.

Data words going to and from the microprocessor appear on internal 8-bit data bus 136. These data words are routed to and from the various elements of the controller under control of the chip select, SYNC and address signals operating through the control logic function 138. A data word from the microprocessor may be used to load a number into one of five interval timers 140. Loading the number into an interval timer causes the timer to begin counting, and when its count reaches the value of the number loaded, the timer transmits an interrupt signal on one of five lines 142 to the corresponding storage location in interrupt storage register 144. The clocking rate of interval timers 140 is 64 microseconds, with the result that an interval timer can be set to time intervals ranging from 64 microseconds to 16.32 milliseconds.

Interrupt storage register 144 has eight interrupt storage locations, four of these being dedicated to inputs from four of the interval timers 140. A fifth interrupt storage location is selectively responsive either to an input from the fifth interval timer, or to 0 to 1 transitions in one of the bit positions of the 8-bit parallel input word appearing on bus 124. Interrupts generated by such 0 to 1 transitions are coupled by line 146 to interrupt storage register 144. A sixth storage location in interrupt storage register 144 is dedicated to an XMT INT signal appearing on line 148. When transmit buffer 150 is empty and ready to receive a new data word from the microprocessor, the logic level on line 148 goes high so as to generate an interrupt indicative of the ready state of the transmit buffer.

A seventh storage location in interrupt storage register 144 is dedicated to an RCV INT signal appearing on line 152. When serial input data is transferred from receive register 154 by means of 8-bit data bus 156 to receive buffer 158, the RCV INT signal appearing on line 152 goes high so as to generate an interrupt to indicate that receive buffer 158 is ready to transfer the data word to the microprocessor. The final interrupt storage location is dedicated to 0 to 1 transitions depicted at block 134 and coupled to storage register 144 by line 160.

Mask register 162 contains eight storage locations which may be loaded by the contents of a data word appearing on data bus 136. The data bits stored in mask register 162 are "ANDed" with the contents of interrupt storage register 144 appearing on bus 164, and the resultant gated 8 bits transferred to priority logic circuit 166.

Circuit 166 prioritizes the mask register signals according to the logic equations shown below.

| | | |
|---|---|---|
| ROMAD0 | = INT0 | (1) |
| ROMAD0 | = $\overline{INT0}$*INT1 | |
| ROMAD2 | = $\overline{INT0}$*$\overline{INT1}$*INT2 | |
| ROMAD3 | = $\overline{INT0}$*$\overline{INT1}$*$\overline{INT2}$*INT3 | |
| ROMAD4 | = $\overline{INT0}$*$\overline{INT1}$*$\overline{INT2}$*$\overline{INT3}$*INT4 | |
| ROMAD5 | = $\overline{INT0}$*$\overline{INT1}$*$\overline{INT2}$*$\overline{INT3}$*$\overline{INT4}$*INT5 | |
| ROMAD6 | = $\overline{INT0}$*$\overline{INT1}$*$\overline{INT2}$*$\overline{INT3}$*$\overline{INT4}$*$\overline{INT5}$*INT6 | |
| ROMAD7 | = $\overline{INT0}$*$\overline{INT1}$*$\overline{INT2}$*$\overline{INT3}$*$\overline{INT4}$*$\overline{INT5}$*$\overline{INT6}$*INT7 | |
| INTERRUPT | = INT0+INT1+INT2+INT3+INT4+INT5+INT6+INT7 (TO CPU) | (2) |

The signals ROMADJ, J=0, 1, . . . , 7, are the output bits from Priority Logic circuit 166 while the signals INTJ are the input bits from Mask Register 162. The INTJ bits are "ORed" to generate an INTERRUPT signal to the microprocessor.

RST instructions for the microprocessor are contained in an 8-bit by 8-bit interrupt address (RST) ROM 168. The ROM is addressed by the prioritized interrupt signals ROMADJ. The controller gates the proper RST instruction onto data bus 136 when an interrupt acknowledge is received or when a read interrupt address command is received from the microprocessor.

Receive register 154 continuously monitors line 128 for incoming serial data. Such incoming data may be received asynchronously and is clocked bit by bit into receive register 154. When the register is full, the 8-bit input word is transferred by bus 156 to receive buffer 158. This causes the RCV INT signal on line 152 to go high so as to generate an interrupt.

Data words from the microprocessor may be loaded into transmit buffer 150. When this occurs, if transmit register 170 is not busy transmitting a previous data word, the data word is transferred from buffer 150 to register 170 and shifted out bit by bit onto XMT Data line 130. When the data word is transferred from buffer 150 to register 170, the XMT INT signal on 148 goes high to generate an interrupt indicating that transmit buffer 150 is ready to receive another word.

Output register 172 is an 8-bit static storage register that drives the eight external outputs 126 of the controller. The output register is loaded from the data bus 136 when a load output register command is issued by the microprocessor. Each external output line is the complement of the corresponding bit appearing on bus 136.

The parallel 8-bit input signal appearing on line 124 is coupled by input buffer 174 to bus 136 when a read external inputs command is issued by the microprocessor. In the preferred embodiment, bit 7 of this external input is also monitored by 0 to 1 detector 176 for the generation of an interrupt signal.

Controller status words are generated as indicated symbolically by block 178 and may be transferred, upon command from the microprocessor, to the data bus.

The controller in the preferred embodiment is an N-channel MOS device and is packaged in a 40 pin dual-in-line package. A detailed description of the various elements of the controller follows.

Interval Timers

Figure 2A:
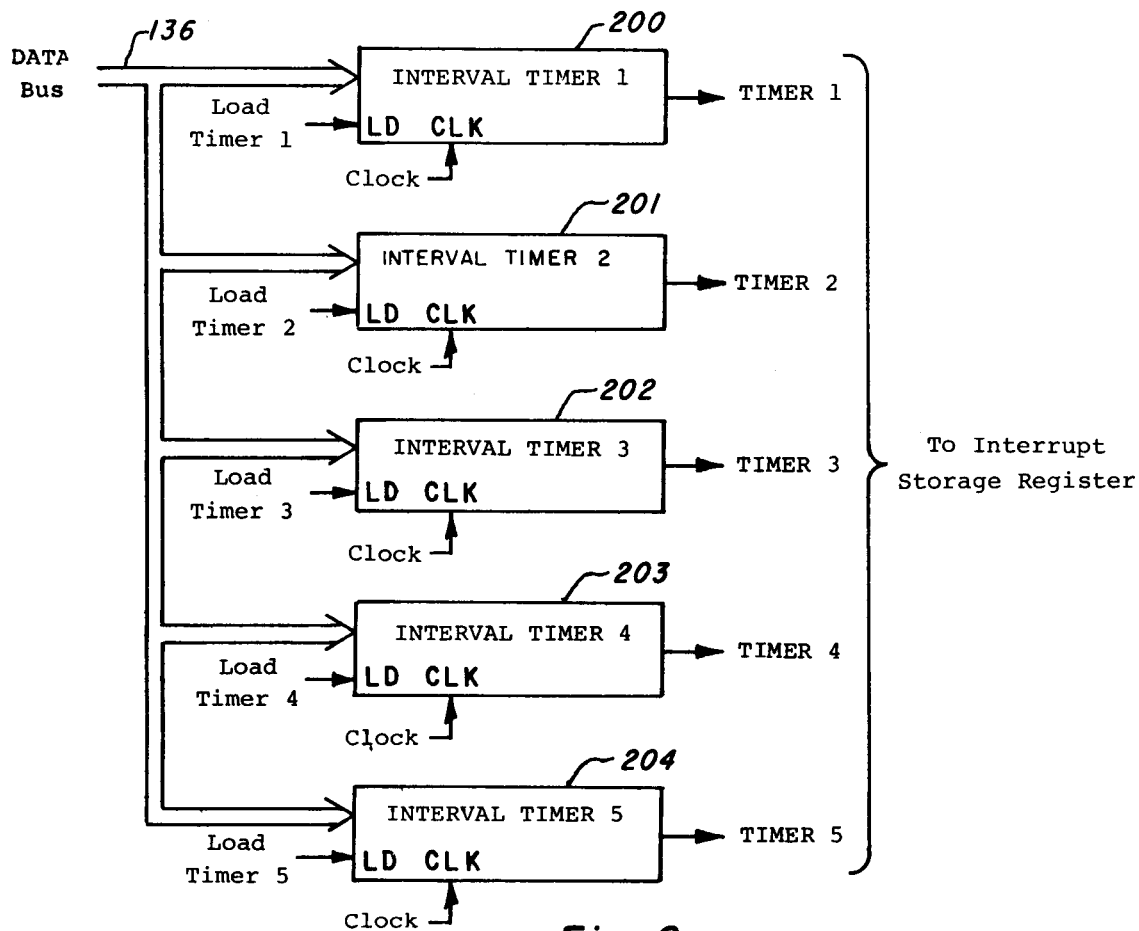
FIGS. 2a and 2b show the configuration of the interval timers.

FIG. 2a is a block diagram of the interval timers 140 illustrated in FIG. 1. The five interval timers 200-204 are each coupled to the 8-bit parallel data bus 136. Generation of a load timer signal for one of the interval timers has the effect of transferring the 8-bit binary word on data bus 136 into the timer. The timer, under control of the clock input, counts down from this initial value to zero. When the count of zero is reached, the corresponding bit is set in interrupt storage register 144 and the timer is inhibited until loaded with a new value from the data bus.

Figure 2B:
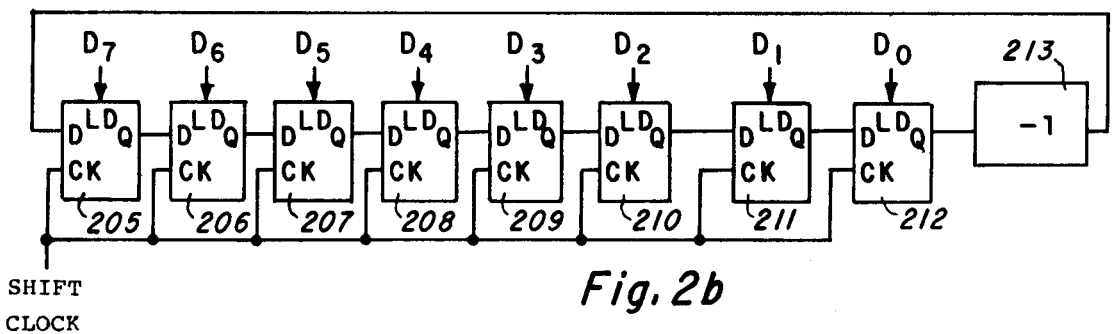

The structure of an interval timer is illustrated in greater detail in FIG. 2b. The timer comprises a chain of eight D flip-flops, 205-212. With the exception of flip-flop 212, each flip-flop has its output coupled to the D input of the next lower order flip-flop. A load timer pulse loads the eight data bus bits $D_0$ through $D_7$ into the flip-flops in the order shown. At each clock pulse, the signal appearing at the D input of a flip-flop is transferred to its Q output.

Figure 3:
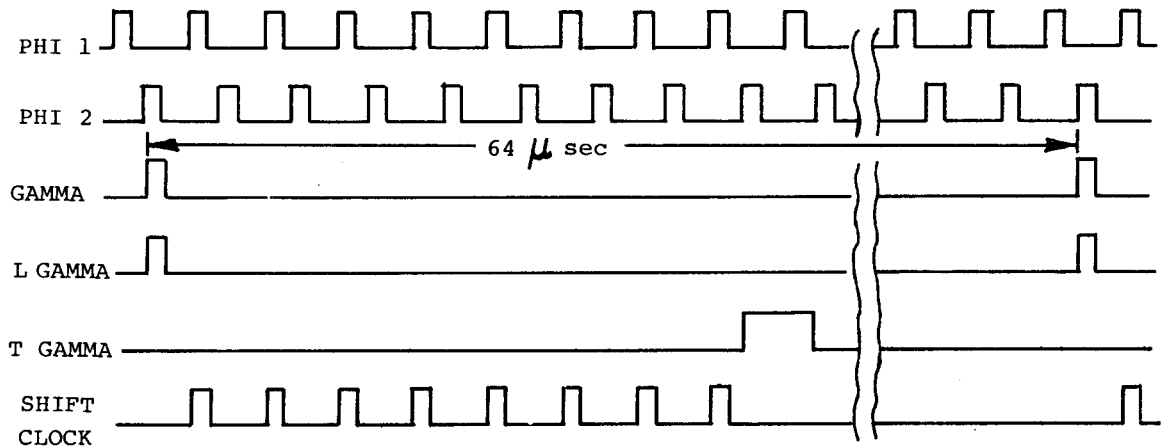
FIG. 3 is a timing diagram for the interval timers.

The generation of the shift clock signal is illustrated by the timing diagram of FIG. 3. The external $\phi_1$ and $\phi_2$ clock signals occur at a pulse repetition rate of 500 nanoseconds as illustrated. At 64 microsecond intervals, a pulse occurs in the GAMMA signal coincident with one of the pulses in the $\phi_2$ clock signal. At the same time, a pulse occurs in the LGAMMA signal as shown. At the eighth pulse in the $\phi_2$ signal after the pulse in the GAMMA signal, a pulse occurs in the TGAMMA signal. These various signals are combined as will be illustrated with respect to FIG. 4b to produce the shift clock signal. The shift clock signal contains eight pulses corresponding to the first eight pulses of the $\phi_1$ signal occurring after a GAMMA pulse. The shift clock signal then remains in the low state until the next GAMMA pulse occurs, there following another set of eight pulses in the shift clock signal.

Figure 4A:
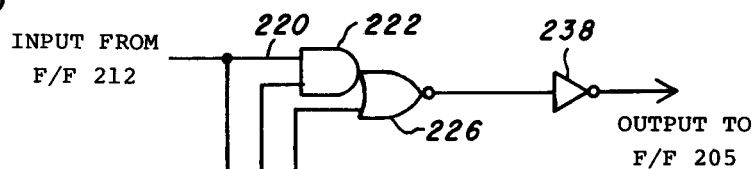
FIGS. 4a and 4b illustrate in schematic form portions of an interval timer.

The output of the lowest order of flip-flops is coupled by a subtract circuit 213 back to the input of the highest order flip-flop. Subtract circuit 213 is illustrated in greater detail in FIG. 4a. The input signal to the subtract circuit appearing on line 220 is coupled to a first input of AND gate 222 and to a first input of NOR gate 224. The output of AND gate 222 provides a first input to NOR gate 226, the second input of this gate being connected by line 228 to the output of NOR gate 224. The GAMMA signal is coupled to a first input of NOR gate 230 by a transfer gate 232 which is controlled by the $\phi_2$ signal. The output of NOR gate 224 is coupled to the second input of NOR gate 230 by transfer gate 234 which is under the control of the $\phi_1$ signal. The output of NOR gate 230 is coupled by transfer gate 236 under control of the $\phi_2$ signal to provide a second input to each of NOR gate 224 and AND gate 222. The output of NOR gate 226 is coupled by inverter 238 to provide an output to flip-flop 205.

The operation of the subtract circuit will first be illustrated assuming that the input from flip-flop 212 is a zero. When the GAMMA signal shifts to the high logic level, the simultaneous high level $\phi_2$ signal couples the high GAMMA signal to one input of NOR gate 230, thereby causing the gate output to go low. This low logic level is coupled by transfer gate 236 to a first input of NOR gate 224. The second input to NOR gate 224, that is, the input from flip-flop 212, is also low with the result that the output of NOR gate 224 is high. This high logic level causes the output of NOR gate 226 to go low and, after inversion by inverter 238, a high logic level is fed back to the input of flip-flop 205. The next $\phi_1$ pulse couples the high logic level at the output of NOR gate 224 through transfer gate 234 to the second input of NOR gate 230. This high level input to gate 230 maintains its output low so that one input to each of NOR gate 224 and AND gate 222 is in the low state. If the next bit received from flip-flop 212 is another zero, the second input to NOR gate 224 is low and its output will be high with the result that the bit transmitted to flip-flop 205 will be a one.

In any given sequence of 8 data bits from flip-flop 212 following a GAMMA pulse, when the first one bit occurs, one of the inputs to NOR gate 230 will be high. This high input may be either the GAMMA pulse gated through transfer gate 232, or a high logic state gated through transfer gate 234 as a result of a preceding zero bit coupled through the subtract circuit. In either case, the result is a low logic level to one of the inputs of NOR gate 224 and AND gate 222. In this case, however, the second input to NOR gate 224 is high and the output of that gate is low. Both inputs to NOR gate 226 being low, its output is high and a zero is returned to flip-flop 205. When the next $\phi_1$ pulse occurs, the low logic level at the output of NOR gate 224 is coupled to an input of NOR gate 230. Now both inputs to NOR gate 230 are low and the next $\phi_2$ pulse couples the high level output of gate 230 to an input of NOR gate 224 and AND gate 222. This enables AND gate 222 to pass the input from flip-flop 212 whether it be a zero or a one, and NOR gate 226 with a low input on line 228 acts as an inverter to the output of AND gate 222. After inversion of the signal by inverter 238, the result is that the signal returned to flip-flop 205 is the same as that received from flip-flop 212.

In summary, the function of the subtract circuit for any sequence of 8 bits received after a GAMMA pulse is to invert all zero bits to one bits until a one input bit is received. This first one input bit is inverted to a zero bit, and thereafter all received bits are passed directly to the output without modification until the next GAMMA pulse.

It will be seen from the above description of the operation of subtract circuit 213 and from a consideration of FIG. 2b along with the timing diagrams of FIG. 3, that the effect of each eight shifts following a GAMMA pulse is to reduce the count in the timer by one. Since the GAMMA pulses are separated by 64 microsecond intervals, the time required for the timer to count down to zero is the product of 64 microseconds and the count originally loaded into the timer. The controller may, however, be operated in a TEST mode in which case the pulses in the LGAMMA and TGAMMA signals of FIG. 3 occur at 8 microsecond intervals. In this case, the count in the timer is reduced by one each 8 microseconds and the interval which is timed is the product of 8 microseconds and the count originally loaded into the timer. Thus the interval timers have either 8 or 64 microsecond resolution.

Figure 4B:
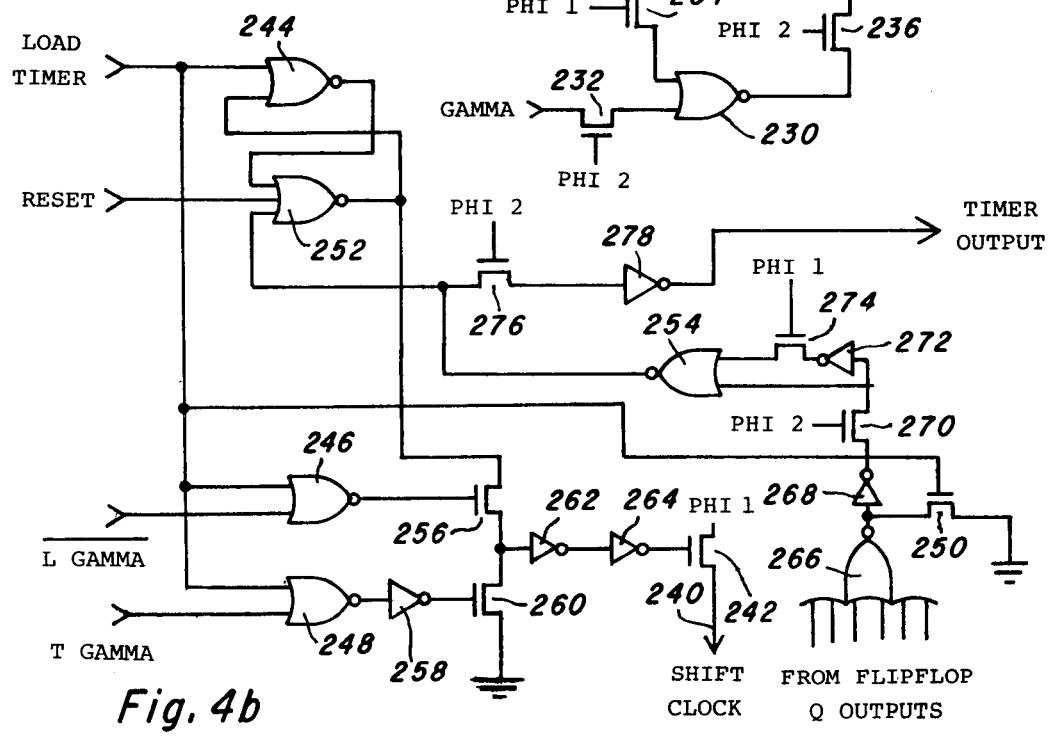

The detection of a zero count and the control of the timer is accomplished with the aid of the circuit illustrated in FIG. 4b. The shift clock signal appearing on line 240 is generated from the $\phi_1$ signal under control of gate 242. The load timer signal provides a first input to each of NOR gates 244, 246 and 248, and also controls transfer gate 250. The output of NOR gate 244 provides a first input to NOR gate 252, while the second and third inputs of NOR gate 252 are the RESET signal and the output of NOR gate 254, respectively. The output of NOR gate 252 is coupled to a second input of NOR gate 244 and to transfer gate 256. The second input to NOR gate 246 is the $\overline{\text{LGAMMA}}$ signal and the output of NOR gate 246 controls transfer gate 256. The second input to NOR gate 248 is the TGAMMA signal, and the output of NOR gate 248, after inversion in inverter 258, controls transfer gate 260. One terminal of transfer gate 260 is connected to ground, while its other terminal, in common with a terminal of transfer gate 256, provides an input to the cascade of inverters 262 and 264. The output of inverter 264 controls transfer gate 242. The eight Q outputs from the flip-flops of the timer are coupled to the inputs of 8-input NOR gate 266. The output of NOR gate 266 is connected through transfer gate 250 to ground and also to inverter 268. The output of inverter 268 is coupled through transfer gate 270 under control of the $\phi_2$ signal to a first input of NOR gate 254. The output of transfer gate 270 is also coupled through inverter 272 and transfer gate 274 under control of the $\phi_1$ signal to a second input of NOR gate 254. The output of NOR gate 254 is coupled through transfer gate 276 under control of the $\phi_2$ signal and through inverter 278 to provide the timer output signal.

The timer is inhibited by a RESET signal which is in the high state during a RESET condition. This causes a low logic level at the output of NOR gate 252 with the result that the output of inverter 264 is also low and transfer gate 242 is open so as to decouple the shift clock output from the $\phi_1$ signal. When the RESET signal is low and a high level LOAD TIMER signal is received, the outputs of NOR gates 244, 246 and 248 go low and transfer gate 250 is enabled thereby grounding the output of NOR gate 266. Under these conditions, all three inputs to NOR gate 252 will be low, but its high level output is decoupled from the input of inverter 262 by the low logic appearing at the output of NOR gate 246. At this same time, the low logic level at the output of NOR gate 248 is inverted by inverter 258 to turn on transfer gate 260 and ground the input of inverter 262. This causes the shift clock to be disabled by transfer gate 242 during the LOAD TIMER operation. After the LOAD TIMER signal goes low, the high level output of NOR gate 252 which is coupled to one input of NOR gate 244 maintains the output of NOR gate 244 low. When the $\overline{\text{LGAMMA}}$ signal goes low at the time of a GAMMA pulse, the resulting high level at the output of NOR gate 246 turns on transfer gate 256 to transfer the high level at the output of NOR gate 252 to the input of inverter 262. Even after the $\overline{\text{LGAMMA}}$ signal returns high, this high level remains at the input of inverter 262 until pulled low by transfer gate 260. The high level signal appearing at the input of inverter 262 results in turning on transfer gate 242 so as to couple the 100 $_1$ signal to the SHIFT CLOCK output. Accordingly, a sequence of pulses occurs at the SHIFT CLOCK output as illustrated in FIG. 3. This continues until the TGAMMA signal goes high, four microseconds after the GAMMA pulse. The high level TGAMMA signal results in a low level at the output of NOR gate 248 and a high level at the output of inverter 258. This turns on transfer gate 260 and pulls the input of inverter 262 low, thereby turning off transfer gate 242 to terminate the sequence of SHIFT CLOCK pulses. The SHIFT CLOCK then remains low until the next $\overline{\text{LGAMMA}}$ pulse after which another sequence of eight pulses appears on the SHIFT CLOCK output.

When the timer has counted down to zero, all eight inputs to the NOR gate 266 are low. The resultant high output level, after inversion by inverter 268, is transferred by the next $\phi_2$ pulse through transfer gate 270 to provide a low logic level on one input of NOR gate 254. Since the other input of NOR gate 254 will have been set to the low logic state by the last previous $\phi_1$ pulse, the output of NOR gate 254 goes high. This high level is transferred through transfer gate 276 by the $\phi_2$ pulse and inverted to a low logic level at the timer output. At the same time, the high logic level at the NOR gate 254 causes the output of NOR gate 252 to go low, thereby disabling the SHIFT CLOCK. At this point, both inputs to NOR gate 244 are low and its output goes high, thereby locking NOR gate 252 to a low output condition. In this way, further operation of the timer is inhibited until the next LOAD TIMER pulse occurs. The low logic level appearing at the output of transfer gate 270 is inverted high by inverter 272 and coupled by the next $\phi_1$ pulse to the second input of NOR gate 254. This has the result of causing the output of NOR gate 254 to go low, and the next $\phi_2$ pulse couples this low level through transfer gate 276 and inverter 278 to cause the timer output signal to return to its normally high state. At this point, the interval timer is prepared for the next LOAD TIMER pulse.

If all zeros are loaded into an interval timer, the timer will generate an immediate INTERRUPT signal at the timer output and will inhibit the counter. Alternatively, loading of a new count value while a timer is in the counting mode, will nullify the old count and begin a new time interval indicated by the new count.

Interrupt Handling

Figure 5A:
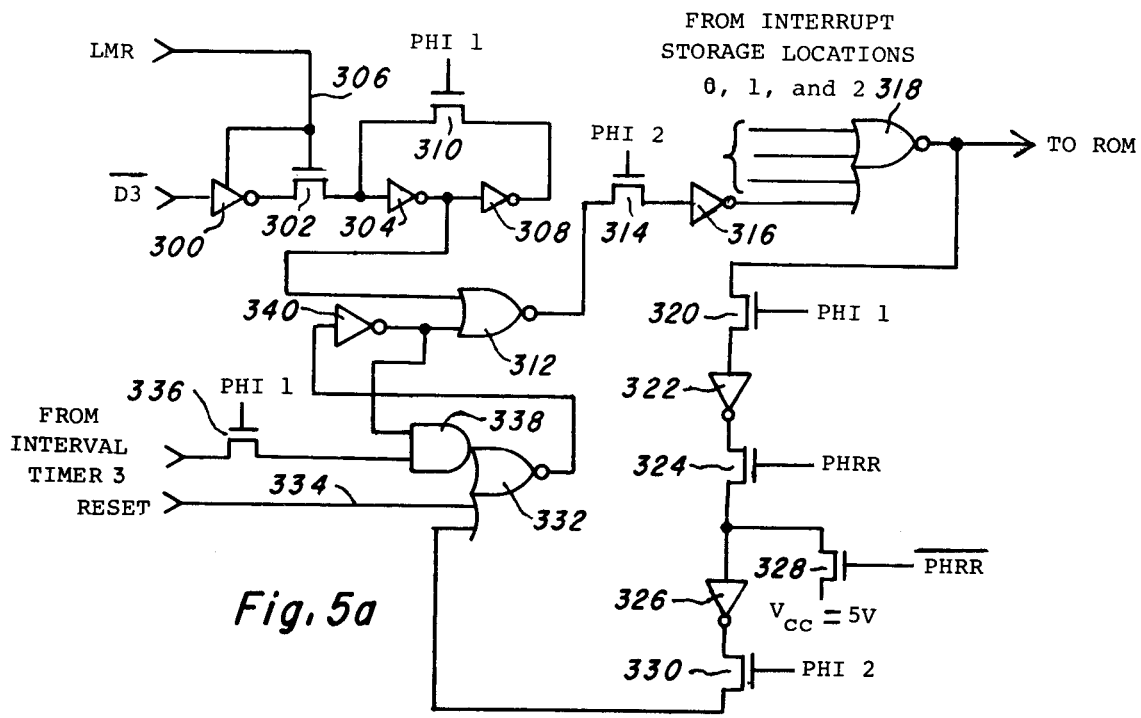
FIGS. 5a and 5b illustrate schematically the structure of the interrupt storage register, the mask register, the priority logic, and the interrupt address ROM.

FIG. 5a illustrates the detailed structure of interrupt storage register 144, mask register 162 and priority logic 166. The circuit of FIG. 5a comprises the signal flow path for one of the eight interrupts, the other seven interrupts being processed by circuits which, with a few exceptions to be noted, are identical to that of FIG. 5a. The circuit of FIG. 5a is dedicated to processing interrupts received from the third interval timer.

The $\overline{D_3}$ bit from internal data bus 136 is coupled through gated inverter 300 and transfer gate 302 to an input of inverter 304. Transfer gate 302 is controlled by a load mask register (LMR) signal appearing on line 306. The output of inverter 304 is coupled to an input of inverter 308 and then through transfer gate 310 back to the input of inverter 304. Transfer gate 310 is controlled by the $\phi_1$ clock signal. The output of inverter 304 also provides a first input to NOR gate 312. The output of NOR gate 312 is coupled through transfer gate 314 under control of the $\phi_2$ clock signal and through inverter 316 to a first input of NOR gate 318. The other three inputs to NOR gate 318 come from transfer gates corresponding to transfer gate 314 in the zero, one and two storage locations of interrupt storage register 144. The output of NOR gate 318 is an address signal to the interrupt address ROM 168. The output of NOR gate 318 is also coupled through transfer gate 320 under control of the $\phi_1$ clock signal to inverter 322. The output of inverter 322 is coupled through transfer gate 324 under control of a PHRR clock signal to the input of inverter 326. The input of inverter 326 may be clamped to the $V_{CC}$ level by transfer gate 328 under control of the $\overline{PHRR}$ signal. The output of inverter 326 is coupled by transfer gate 330 under control of the $\phi_2$ clock signal to an input of NOR gate 332. A second input to NOR gate 332 is the system RESET signal appearing on line 334. The input signal from interval timer 3 is coupled by transfer gate 336 under control of the $\phi_1$ signal to a first input of AND gate 338. The output of AND gate 338 provides a third input to NOR gate 332. The output of NOR gate 332 is coupled through inverter 340 to the second input of NOR gate 312 and also to the second input of AND gate 338.

Operationally, a high level system RESET command on line 334 clears the output of the interrupt storage location to zero. The high level RESET command causes the output of NOR gate 332 to go low, the output of inverter 340 to go high, and the output of NOR gate 312 to go low. The next $\phi_2$ pulse turns on transfer gate 314 and couples the low level to inverter 316. The resultant high input to NOR gate 318 causes a low logic level signal at the output to the ROM. At the same time, the high logic state at the output of inverter 340, along with the normally high logic level from interval timer 3 cause the output of AND gate 338 to go high, thereby maintaining the output of NOR gate 332 low, even after the RESET function returns to its low logic level. In this way, AND gate 338 is enabled to detect one to zero transitions on the signal from interval timer 3.

With reference next to the mask register 162, when the load mask register signal goes high, the $\overline{D_3}$ signal is inverted twice and coupled to an input of NOR gate 312. If the interrupt from interval timer 3 is to be enabled, the $\overline{D_3}$ signal will be low at this time and the resultant low level input to NOR gate 312 permits this gate to recognize transitions at the output of inverter 340. When the signal from interval timer 3 goes low indicating that the timer has counted down to zero, the next $\phi_1$ pulse clocks this low logic level through transfer gate 336 to turn off AND gate 338 and cause the output of NOR gate 332 to go high. This high level, after inversion by inverter 340, causes the output of NOR gate 312 to go high. The next $\phi_2$ pulse clocks this mask interrupt through transfer gate 314 to priority logic circuit 166 which comprises inverter 316 and NOR gate 318. It will be seen that the high level interrupt signal at the output of transfer gate 314 will be gated to priority logic circuit 166 only if the interrupt signal from storage locations zero, one and two are in the low state. Thus, the priority logic circuit acomplishes the priority logic for ROMAD3 as set forth in equation (1) above.

The high level prioritized signal at the output of NOR gate 318 is coupled through transfer gate 320 by the next $\phi_1$ clock pulse to inverter 322. When the microprocessor signals the controller chip to transmit an interrupt address, either with a read ROM command, or with an interrupt acknowledge ($\overline{D_0}$ of the microprocessor status word), the PHRR signal switches to the high logic state. This couples the low level at the output of inverter 322 through transfer gate 324 to inverter 326. The high level at the output of inverter 326 is coupled through transfer gate 330 by the next $\phi_2$ signal to an input of NOR gate 332. This high level signal clears the interrupt storage register location in the same manner as a RESET signal and prepares the storage register for receiving the next interrupt from interval timer 3. After the PHRR signal goes low, the high level $\overline{PHRR}$ signal turns on transfer gate 328, clamping the input of inverter 326 to a 5 volt level, thereby removing the high level signal from NOR gate 332 and enabling this gate to pass the next interrupt from interval timer 3. It will be noted that the interrupt storage register location is cleared only when priority logic circuit 166 has passed the interrupt stored in that location to the ROM and the corresponding interrupt address has been transmitted to the microprocessor.

The feedback loop comprising inverters 304, 308 and transfer gate 310 continually refreshes the mask bit loaded from line $\overline{D_3}$ since it may be necessary in some instances to retain this mask bit for extended periods of time.

Figure 5B:
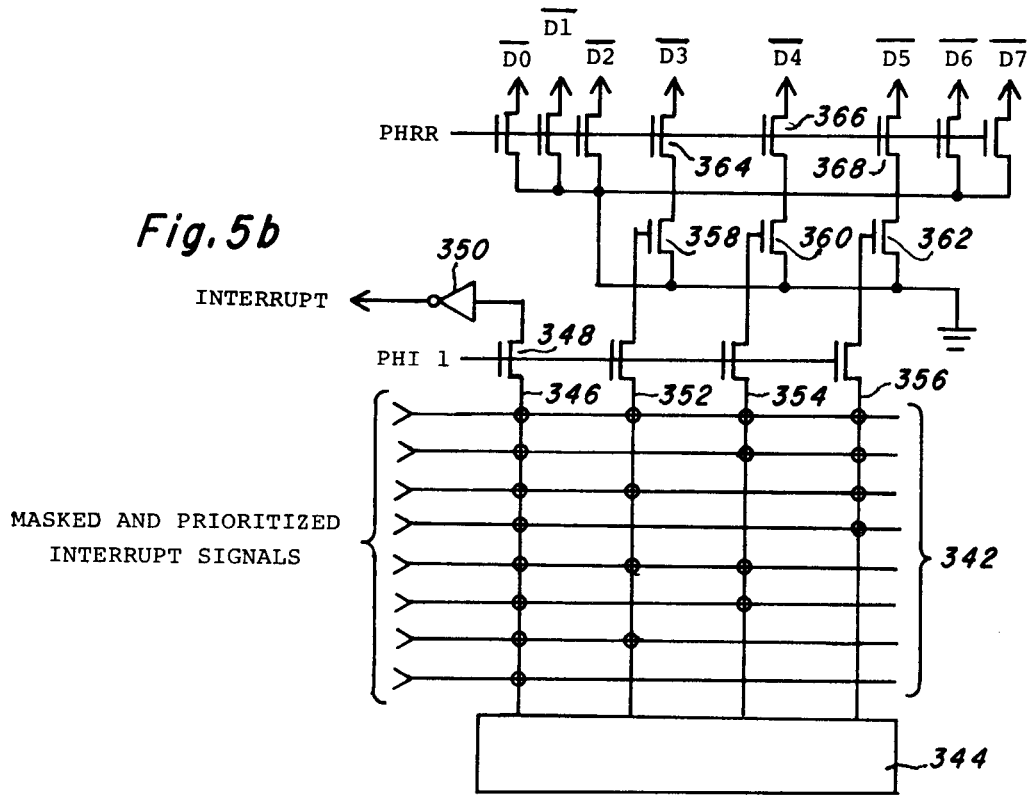

Interrupt address ROM 168 is illustrated in FIG. 5b. Masked and prioritized interrupt signals appear on lines 342. If one or more unmasked interrupt signals have been generated, then one of the lines 342 corresponding to the highest priority interrupt will be high, while all other lines will be low. Load 344 serves to maintain the vertical lines of the ROM in the high logic state except when a vertical line has a programmed junction with one of the interrupt signals having a high logic level. Programmed junctions are indicated in FIG. 5b by circles at the intersection. Thus, line 346 will be high only if none of the masked and prioritized interrupt signals are high. If any of these interrupt signal lines are high, indicating that there exists an unserviced interrupt, the resultant low level on line 346 is coupled through transfer gate 348 by the next $\phi_1$ signal and inverted by inverter 350 to provide a high level interrupt signal. This interrupt signal is returned by the controller chip to the microprocessor to indicate that an interrupt is pending. Line 352 will be high, except when any of interrupt signals zero, two, four and six are high. Other patterns of interrupt signals control the logic level appearing on lines 354 and 356. The logic levels appearing on lines 352, 354 and 356 are gated by the $\phi_1$ clock pulse to transfer gates 358, 360 and 362, respectively. A high level logic signal coupled from line 352 closes transfer gate 358, thereby coupling a low logic level to transfer gate 364. Similarly, high logic levels appearing on lines 354 and 356 result ultimately in low logic levels to transfer gates 366 and 368, respectively. When the microprocessor requests that an interrupt address be transmitted, the resultant high level PHRR signal gates these signals to bits 3, 4 and 5 of the internal data bus. It will be noted that bits 0, 1, 2, 6 and 7 of the interrupt address are always gated onto the internal data bus as zeros. Keeping in mind the fact that the information on internal data bus 136 is inverted by buffer 102 before transmission on data bus 100 to the microprocessor, it will be seen that the interrupt addresses corresponding to the various interrupt signals will have the values given in Table I.

TABLE I

| Mutually Exclusive Prioritized Interrupt | $D_0$ | $D_1$ | $D_2$ | $D_3$ | $D_4$ | $D_5$ | $D_6$ | $D_7$ |
|---|---|---|---|---|---|---|---|---|
| ROMAD0 | 1 | 1 | 1 | 0 | 0 | 0 | 1 | 1 |
| ROMAD1 | 1 | 1 | 1 | 1 | 0 | 0 | 1 | 1 |
| ROMAD2 | 1 | 1 | 1 | 0 | 1 | 0 | 1 | 1 |
| ROMAD3 | 1 | 1 | 1 | 1 | 1 | 0 | 1 | 1 |
| ROMAD4 | 1 | 1 | 1 | 0 | 0 | 1 | 1 | 1 |
| ROMAD5 | 1 | 1 | 1 | 1 | 0 | 1 | 1 | 1 |
| ROMAD6 | 1 | 1 | 1 | 0 | 1 | 1 | 1 | 1 |
| ROMAD7 | 1 | 1 | 1 | 1 | 1 | 1 | 1 | 1 |

The generation of an interrupt signal to the microprocessor and the provision of a corresponding address in response to a signal from the microprocessor will be referred to as a vectored interrupt capability.

The other seven interrupts are handled in much the same manner as illustrated in FIG. 5a, subject to the following differences. First, the priority logic circuit for each interrupt comprises a NOR gate such as NOR gate 318, with the interrupt passing through an inverter to provide one input to the NOR gate. All higher order interrupts are coupled directly to other inputs of the NOR gate. In the case of the highest order interrupt, the priority logic circuit simply comprises a cascade of two inverters.

Interrupt storage location 7 may selectively store either an interrupt corresponding to the expiration of interval timer 5, or an interrupt corresponding to a zero to one transition in bit 7 of external input bus 124. The circuit controlling this selection is illustrated in FIG. 6. Bit 7 of the external input bus is coupled through buffer 370 and transfer gate 372 under control of the $\phi_1$ clock signal to inverter 374. The output of inverter 374 passes through inverter 376 to inverter 378. A refresh loop around inverter 374 and 376 comprises transfer gate 380 which is controlled by the $\phi_2$ clock pulse. The output of inverter 378 is coupled through transfer gate 382 also under control of the $\phi_2$ clock pulse to inverter 384. The input of inverter 384 is also coupled to a first input of NOR gate 386. The output of inverter 384 is coupled through transfer gate 388 under control of the $\phi_1$ clock signal to the second input of NOR gate 386. The output of NOR gate 386 is coupled through transfer gate 390 under control of the $\phi_2$ clock signal and through inverter 392 to inverter 394. The output of inverter 394 comprises a first input of AND gate 396.

The $D_2$ signal provides a first input to AND gate 398 and through inverter 400 to AND gate 402. The DISCOM signal provides a second input to each of AND gates 398 and 402. The output of AND gate 398 provides a first input to NOR gate 404. The output of AND gate 402 provides a first input to NOR gate 406. The output of NOR gate 404 is coupled to the second input of AND gate 396 and to the second input of NOR gate 406. The output of NOR gate 406 is coupled to an input of AND gate 408 and to the second input of NOR gate 404. AND gates 396 and 408 provide the two inputs to NOR gate 410. The output of NOR gate 410 is coupled to the point in the seventh interrupt storage location corresponding to transfer gate 336 of FIG. 5a. The output signal from interval timer 5 is coupled through inverter 412 to the second input of AND gate 408.

That portion of the circuit between the input labeled "external input 7" and the output of inverter 392 comprises the zero to one detector for the data on line 7 of the external input bus. The data on line 7 is buffered, clocked in by transfer gate 372, refreshed by the loop comprising inverters 374, 376 and transfer gate 380, and inverted by inverter 378. Thus, if the input is the low logic state, the output of inverter 378 will be high. This high level is gated by the next $\phi_2$ pulse to one input of NOR gate 386. The high level is also inverted by inverter 384 and gated by the next $\phi_1$ pulse to the second input of NOR gate 386. Thus, in the normal condition with a low level input signal, the inputs to NOR gate 386 will be a zero and a one, respectively, with the consequent low level output of the NOR gate being inverted by inverter 392 to a high logic level. If the data on line 7 switches to a high logic level, this ultimately results in a low level at the output of inverter 378. The next $\phi_2$ clock pulse transfers this low level to an input of NOR gate 386 so that for the moment both inputs are low. The consequent high level output of the NOR gate is gated by the same $\phi_2$ clock pulse and inverted to a low logic level by inverter 392. The low level input to inverter 384 causes a high level at its output and the next $\phi_1$ clock pulse transfers this to the second input of NOR gate 386. The consequent low level output is transferred by the next $\phi_2$ clock pulse and inverted by inverter 392 to a high logic level. This output remains high until the next zero to one transition in the data appearing on line 7. Thus, the circuit functions to provide a short low logic level pulse corresponding to each zero to one transition.

A similar circuit is provided to accomplish the function 134 of FIG. 1.

One of the commands which may be received by the controller chip on address bus 108 is referred to as "issue discrete commands." When this command is received, the logic state on the DISCOM line goes high. At this time the controller, inter alia, monitors the logic level on the $\overline{D_2}$ line to determine whether the seventh interrupt storage location will be used to store interrupts received from line 7 of the external input bus or to store interrupts from interval timer 5. The remainder of the circuit of FIG. 6 monitors these two inputs to control the interrupt routing. The combination comprising AND gates 398 and 402, NOR gates 404 and 406 and inverter 400, function so that when the DISCOM logic level is high, the output of NOR gate 406 has the same logic state as the $\overline{D_2}$ line, while the output of NOR gate 404 has the opposite logic state. Thus, if the $\overline{D_2}$ line is high, AND gate 408 will be enabled while AND gate 396 is disabled. In this case, interrupts from interval timer 5 are inverted by inverter 412, passed through AND gate 408, and reinverted by NOR gate 410 to be coupled to the interrupt storage location. Conversely if the $\overline{D_2}$ signal is low, then AND gate 396 will be enabled by the high level at the output of NOR gate 404 and AND gate 408 will be disabled. In this case, the interrupt from external input 7 at the output of inverter 392 is inverted by inverter 394, passed by AND gate 396, and reinverted by NOR gate 410 to be coupled to the interrupt storage location. When the DISCOM input goes low, the circuit functions to hold the logic levels at the outputs of NOR gates 404 and 406 that were set with the DISCOM input high. Thus, the circuit continually functions to enable the selected interrupt until the microprocessor transmits another "issue discrete commands" address to alter the selection.

Serial Data Receiver

The function of the serial data receiver comprising receive register 154 and receive buffer 158 is to synchronize with the incoming serial data (at a selected baud rate ranging in seven steps from 110 to 9600 baud) and provide bit to bit timing for input to the 8-bit receive buffer. The serial data receiver has a resettable counter and decoding logic for determining half-bit and full-bit times for the particular baud rate selected by the microprocessor. The serial input line is normally in a high state. Each 8-bit data word is preceded by a state bit which is a zero, and is followed by one or two "one" level stop bits. When a one to zero transition is detected on the serial input data line and the counter is in the search (start bit) mode, the counter is incremented until the middle of the start bit is detected. If the serial input data line should return to a logic one during this interval, the counter resets and starts over again. After the start bit is detected, the counter times full-bit times to determine the center of all succeeding bits. When the middle of the start bit is detected, a start bit detected flag is set to logic one. When the middle of the first data bit is detected, a full-bit detected flag is set to a logic one. Both of these flags are cleared to logic zero when the last bit is detected. These flags may be read as I/O status. When a full 8-bit character has been received, it is transferred from receive register 154 to receive buffer 158 from which it is gated to data bus 136 when a read receiver buffer register (RRB) function is addressed by the microprocessor unit. When the receive buffer 158 is loaded, the receive buffer loaded flag is set to a logic one, indicating a new received character is ready and generating an interrupt. This flag is available as a status bit and it is cleared to logic zero when the RRB is function is addressed by the microprocessor. If a new character is received before the previous character is read by the microprocessor, the previous character is lost and an overrun flag is set to a logic one. The overrun flag may be read as I/O status and is cleared to logic zero when the read I/O status (RDST) function is addressed by the microprocessor. When the last stop bit of a character is received, a check is made for the validity of the stop bit(s). If one (or both) of the stop bits is incorrect, a framing error flag is set to a logic one. If the stop bit(s) is (are) correct, the framing error flag is set to a logic zero. The framing error flag may be read as I/O status.

Figure 7:
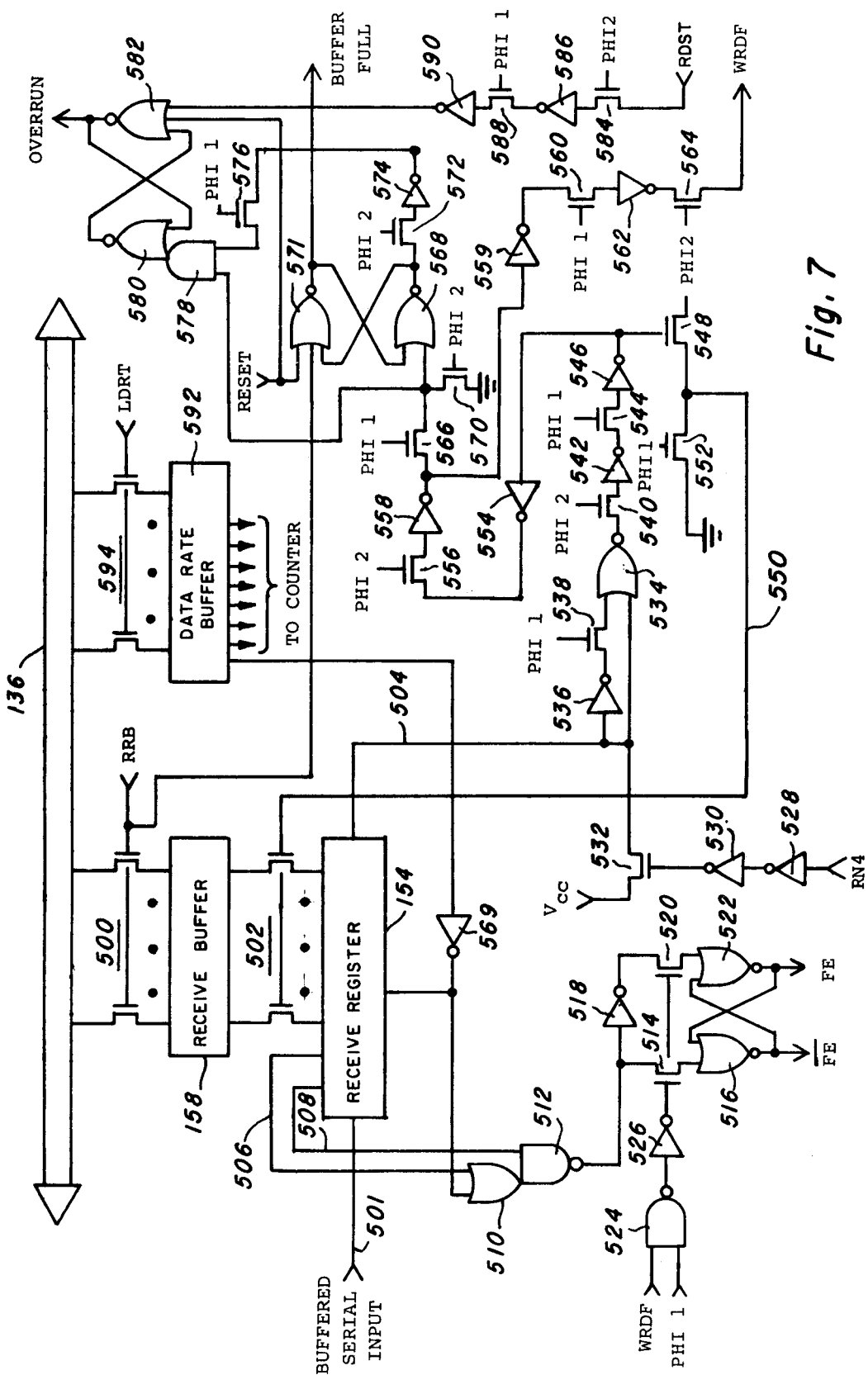
FIG. 7 illustrates schematically the receive buffer and receive register along with a portion of the receiver control circuits.
Figure 8:
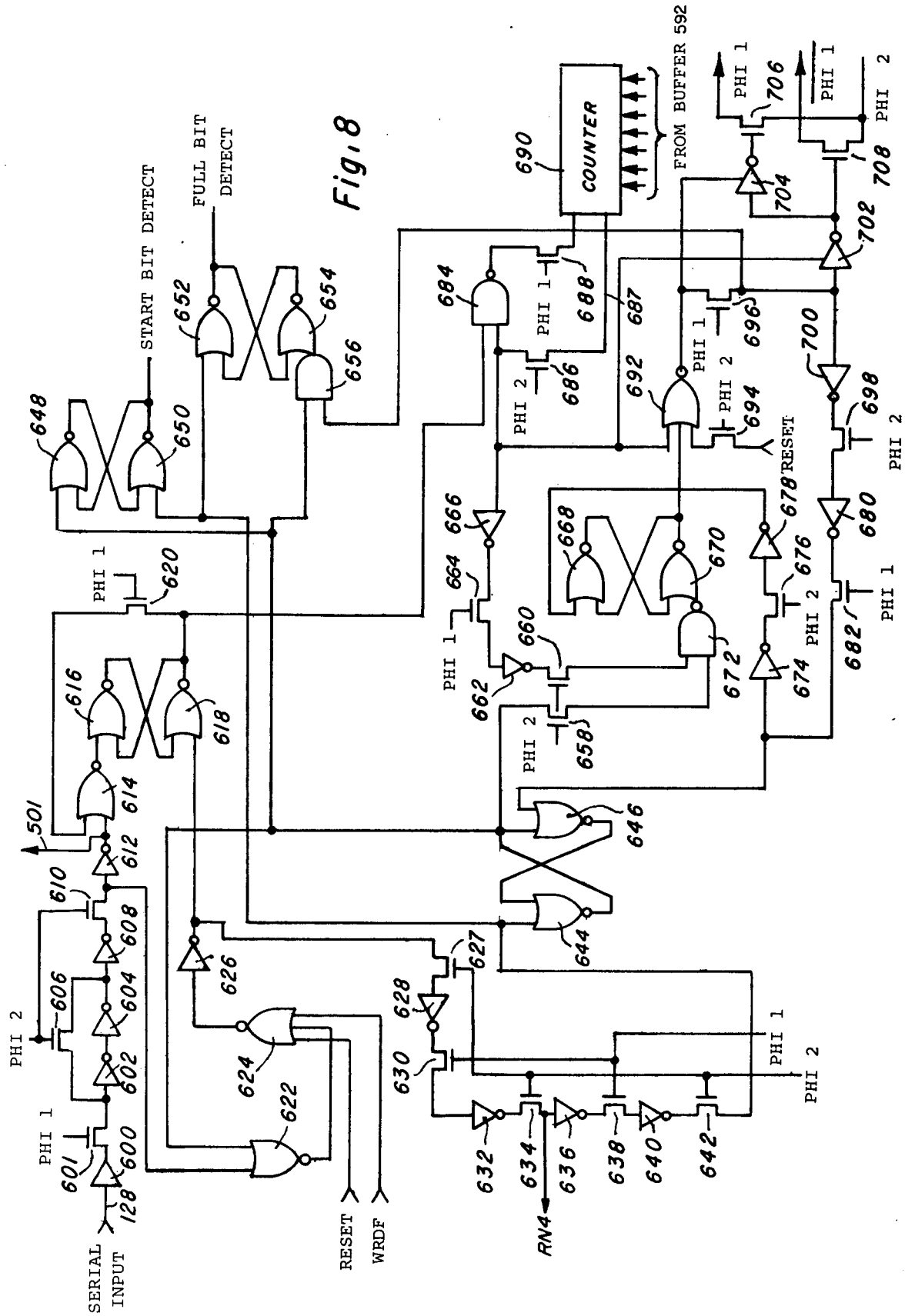
FIG. 8 illustrates schematically additional circuit details of the receiver control circuits.

FIGS. 7 and 8 are schematic diagrams illustrating the serial data receiver. With reference to FIG. 7, a data word stored in receive buffer 158 is selectively coupled to 8-bit data bus 136 by a set of eight transfer gates 500. Transfer of the data to the data bus is under control of the RRB signal. The 8 data bits of a character received on buffered serial input line 501 (from the output of inverter 612 of FIG. 8) may be shifted from receive register 154 to receive buffer 158 by means of eight transfer gates 502. When a full character has been shifted into receive register 154, the zero level start bit appears on line 504. At this same time the high level stop bit or bits, as the case may be, appear on lines 506 and 508. Line 506 provides a first input to OR gate 510 while line 508 provides a first input to NAND gate 512. The second input to NAND gate 512 is the output of OR gate 510. The output of NAND gate 512 is coupled through transfer gate 514 to provide a first input of NOR gate 516 and through inverter 518 and transfer gate 520 to provide a first input to NOR gate 522. A WRDF signal and the $\phi_1$ clock signal are coupled through NAND gate 524 and inverter 526 to control transfer gates 514 and 520. The output of NOR gate 516 is coupled to the second input of NOR gate 522 while the output of NOR gate 522 is coupled to the second input of NOR gate 516. The outputs of NOR gates 516 and 522 comprise the $\overline{FE}$ and the FE signals, respectively.

AN RN4 signal, which is derived from the circuit illustrated in FIG. 8, is coupled through inverters 528 and 530 to control transfer gate 532. Transfer gate 532 may be utilized to clamp the signal level appearing on line 504 to the $V_{CC}$ supply level. The signal appearing on line 504 provides a first input to NOR gate 534, and is coupled through inverter 536 and transfer gate 538 under control of the $\phi_1$ clock signal to provide the second input to the NOR gate 534. The output of NOR gate 534 is coupled through transfer gate 540 under control of the $\phi_2$ clock signal, through inverter 542, through transfer gate 544 under control of the $\phi_1$ clock signal to the output of inverter 546. The output of inverter 546 controls transfer gate 548 which, when turned on, couples the $\phi_2$ clock pulses to line 550. The $\phi_2$ clock pulses appearing on line 550 are used to shift a data word from receive register 154 to receive buffer 158 through transfer gate 502. Transfer gate 552 couples line 550 to ground upon the occurrence of $\phi_1$ clock pulses. The output of inverter 546 is also coupled through inverter 554, and through transfer gate 556 under control of the $\phi_2$ clock pulse to inverter 558. The output of inverter 558 is coupled through inverter 559, through transfer gate 560 under control of the $\phi_1$ clock pulse, through invertr 562 and through transfer gate 564 under control of the $\phi_2$ clock pulse to provide the WRDF signal which comprises a first input to NAND gate 524. The output of inverter 558 is also coupled through transfer gate 566 under control of the $\phi_1$ clock pulse to provide a first input of NOR gate 568. This input of NOR gate 568 is intermittently coupled to ground by transfer gate 570 under control of the $\phi_2$ clock pulse. The output of NOR gate 568 provides a first input to NOR gate 571, the output of which is coupled to the second input of NOR gate 568. The two other inputs to NOR gate 571 are the RRB signal and a RESET signal. The output of NOR gate 571 is the status buffer full signal. The output of NOR gate 568 is coupled through transfer gate 572 under control of the $\phi_2$ clock signal, through inverter 574 and through transfer gate 576 under control of the $\phi_1$ clock signal to one input of AND gate 578. The other input of AND gate 578 is common with an input of NOR gate 568. The output of AND gate 578 provides a first input to NOR gate 580. The output of NOR gate 580 provides a first input to NOR gate 582. A second input to NOR gate 582 is the RESET signal. A read I/O status (RDST) signal is coupled through transfer gate 584 by the $\phi_2$ signal, through inverter 586, and through transfer gate 588 by the $\phi_1$ signal to inverter 590. The output of inverter 590 provides the third input to NOR gate 582. The output of NOR gate 582 is coupled to one input of NOR gate 580 and also provides the status overrun signal.

A data rate buffer 592 has its input lines selectively coupled to the eight bit positions of bus 136 by a set of transfer gates 594. When the load data rate (LDRT) signal goes high, the data appearing on bus 136 is transferred into buffer 592 so as to indicate to the controller chip, the baud rate anticipated by the microprocessor. Bits 0-6 of buffer 592 are coupled to counter 690 of FIG. 8. Only one of these bits will be in a low logic state at any given time, this bit corresponding to the proper count for the baud rate selected. Bit 7 of buffer 592 is coupled through inverter 569 to receive register 154 and to a second input of OR gate 510. Bit 7 is low or high in accordance with whether the incoming data has one stop bit or two stop bits.

Figure 9:
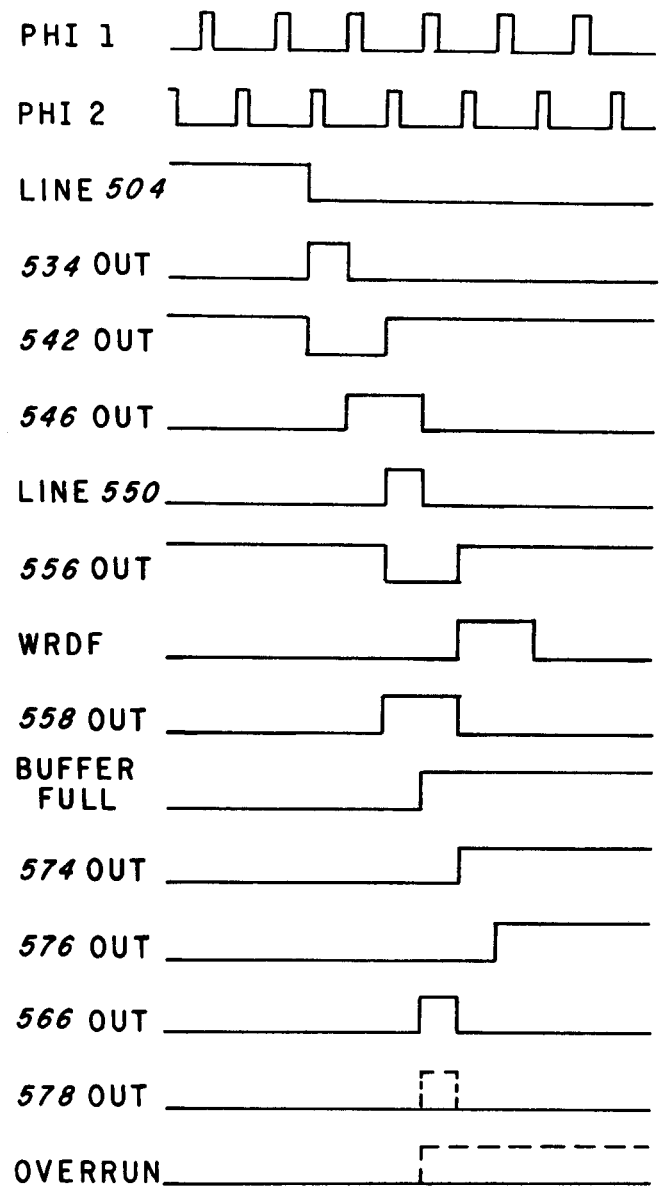
FIG. 9 is a timing diagram for the circuit of FIG. 7.

The operation of the circuit of FIG. 7 may be understood with the aid of the timing diagram of FIG. 9. Initially a high level RESET signal causes both the BUFFER FULL output of NOR gate 571 and the OVERRUN output of NOR gate 582 to set low.

In FIG. 9, several cycles of the $\phi_1$ and $\phi_1$ clock signals are illustrated. It is assumed that a full character has been loaded into receive register 154 and the leading start bit zero causes a one-to-zero transition in the line 504 signal as illustrated in FIG. 9. This causes the output of NOR gate 534 to immediately shift high, but the next $\phi_1$ clock pulse transfers the high level signal from the output of inverter 536 to the input of NOR gate 534 causing the NOR gate output to return to the low state. The one-to-zero transition appearing on line 504 is caused by a $\phi_2$ clock signal, and the same $\phi_2$ clock signal transfers the resultant zero-to-one transition from the output of NOR gate 534 to inverter 542 with a consequent one-to-zero transition in the output of the inverter. The next $\phi_2$ clock signal causes the output of inverter 542 to return high. The one-to-zero transition in the output of inverter 542 is transferred by the next $\phi_1$ clock pulse through transfer gate 544 to cause a zero-to-one transition in the output of inverter 546. The output of inverter 546 is returned low by the next $\phi_1$ clock pulse, but while still in the high state it turns on transfer gate 548 to allow a $\phi_2$ clock pulse to cause line 550 to go high. This high level on line 550 turns on transfer gates 502 so as to couple the eight data bits from receive register 154 into receive buffer 158. The line 550 signal is returned to the low level by the next $\phi_1$ clock pulse turning on transfer gate 552. At this point, the incoming data word resides in buffer 158 and is ready to be transferred onto data bus 136. Receive register 154 is now ready to accept the next incoming data word appearing on the serial input line 128.

The zero-to-one transition at the output of inverter 546 is coupled by the next $\phi_2$ clock pulse to cause a one-to-zero transition at the output of transfer gate 556. The output of transfer gate 556 is returned high by the next succeeding $\phi_2$ clock pulse. The negative going pulse at the output of inverter 559 is gated through transfer gates 560 and 564 by the $\phi_1$ and $\phi_2$ clock pulses and inverted so as to provide the WRDF signal as shown. The negative going pulse in the output of inverter 554 is also inverted by inverter 558 and gated through transfer gate 566 by a $\phi_1$ clock pulse to a first input of NOR gate 568. The positive pulse at the input of NOR gate 568 causes its output to go low, thereby causing the BUFFER FULL output of NOR gate 571 to go high. The low level at the output of NOR gate 568 is transferred through transfer gate 572 by the next $\phi_2$ pulse to cause a low-to-high transition in the output of inverter 574. This transition is coupled through transfer gate 576 by the next $\phi_1$ pulse to an input of AND gate 578. As illustrated in the waveform 566 out of FIG. 9, the high level from transfer gate 566 appearing at the input of NOR gate 568 is returned to zero by the next $\phi_2$ pulse closing transfer gate 570. Accordingly, under normal conditions, the two inputs to AND gate 578 are not simultaneously one. As a result, the output of AND gate 578 remains low, the output of NOR gate 580 remains high, and the output of NOR gate 582 (the overrun signal) remains low. In the normal course of events, a high level RRB signal will be generated by the microprocessor, thereby causing transfer gates 500 to shift the received character from receive buffer 158 onto data bus 136. At the same time, the high level RRB signal causes the output of NOR gate 571 to go low, thereby shifting the output of NOR gate 568 back to its normal high state. The next sequence of $\phi_2$ and $\phi_1$ pulses, therefore, causes the output of transfer gate 576 to return to its normal low state. Succeeding characters received at serial input 501 are handled in like manner.

It may sometimes happen, however, that before the received character is shifted from receive buffer 158 onto data bus 136, a new word is fully transferred into receive register 154, thereby causing the next one-to-zero transition on line 504. This results in another sequence such as that depicted in FIG. 9, but in this case when the output of transfer gate 566 shifts high, the output of transfer gate 576 will still be high from the last received data word. In this case, the new received data word is shifted into receive buffer 158, thereby overriding the previously received data word. As indicated by the dashed lines in FIG. 9, the two high level inputs to AND gate 578 result ultimately in the output of NOR gate 582 going high, thereby indicating an overrun status. This high level output of NOR gate 582 is cleared by the next RDST signal operating through transfer gates 584 and 588 and inverters 586 and 590.

A high level RN4 signal received from the circuit of FIG. 8 operates through inverters 528 and 530 and transfer gate 532 to prevent the above sequence of events occurring when no incoming data has been detected.

If the character being received has two stop bits, then when the character is fully loaded into receive register 154, the signals appearing on both lines 506 and 508 will be high. As a result, the output of NAND gate 512 goes low and the output of inverter 518 goes high. The positive pulse in the WRDF signal coupled with the next $\phi_1$ clock pulse transfer these signals through transfer gates 514 and 520 to the inputs of NOR gates 516 and 522. As a result, the frame error (FE) signal at the output of NOR gate 522 goes low to indicate that no frame error has occurred. If, however, either of the signals appearing on lines 506 and 508 is low as would be the case if one of the stop bits were not received correctly, then the output of NOR gate 522 will be clocked high by the WRDF and $\phi_1$ pulses. In this case, the FE signal goes high to indicate that a frame error has occurred. In the event that only one stop bit is anticipated, the microprocessor will cause the input to inverter 569 to be low, thereby providing a constant high level input to one side of OR gate 510. As a result, the circuit simply monitors the single anticipated stop bit to determine whether or not a frame error has occurred.

Referring next to FIG. 8, there is illustrated the circuit which times the incoming data bits and clocks them into receive register 154. The serial input appearing on line 128 is coupled through buffer 600 and transfer gate 601 to a refresh circuit comprising inverters 602, 604 and transfer gate 606. The output of the refresh circuit is coupled through inverter 608 and transfer gate 610. The output of transfer gate 610 is coupled to a first input of NOR gate 622, through inverter 612 to a first input of NOR gate 614, and also provides the buffered serial input signal on line 501 of FIG. 7. The output of NOR gate 614 provides a first input to NOR gate 616, whose output in turn provides a first input to NOR gate 618. The output of NOR gate 618 is coupled back to an input of NOR gate 616 and through transfer gate 620 to a second input of NOR gate 614. Finally, the output of NOR gate 618 is coupled to an input of NAND gate 684. The output of NOR gate 622 is coupled to an input of NOR gate 624, the other two inputs of this NOR gate being the RESET and WRDF signal, the latter being generated by the circuit of FIG. 7. The output of NOR gate 624 is coupled through inverter 626 to an input of NOR gate 618 and through a cascade comprising transfer gates 627, 630, 634, 638 and 642 and inverters 628, 632, 636 and 640 to an input of NOR gate 644. This input of NOR gate 644 is also common with an input of each of NOR gates 650 and 652. The output of NOR gate 644 is coupled to an input of NOR gate 646, to an input of NOR gate 622, to an input of NOR gate 648, to an input of AND gate 656, and to transfer gate 658. The output of NOR gate 646 is connected to the second input of NOR gate 644.

The output of transfer gate 658 is coupled to a first input of NAND gate 672. The output of NAND gate 672 provides a first input to NOR gate 670, the output of this NOR gate being coupled to an input of NOR gate 692 and an input of NOR gate 668. The output of NOR gate 668 is coupled to a second input of NOR gate 670. A second input to NOR gate 692 is the RESET signal coupled through transfer gate 694. The output of NAND gate 684 is coupled through transfer gate 688 by the $\phi_1$ clock pulse to an input of counter 690. A high level input from tranfer gate 688 zeros counter 690 and inhibits counting. The inputs from buffer 592 establish a count corresponding to the duration of one-half bit period at the baud rate selected by the microprocessor. The output from counter 690 appearing on line 687 is normally low. When the counter reaches the count established by the inputs from buffer 592, the logic level on line 687 goes high to indicate that one-half of a bit period has expired. This signal is coupled through transfer gate 686 to provide a second input to NAND gate 684. The signal is also coupled to an input of NOR gate 692, to the gate input of gated inverter 702, and through inverters 666 and 662 and transfer gates 664 and 660 to a second input of NAND gate 672. The output of NOR gate 692 is coupled through transfer gate 696 to an input of inverter 702, and through the cascade combination of inverters 700 and 680 and transfer gates 698 and 682 to a second input of NOR gate 646. The output of tranfer gate 682 is also coupled through inverters 674 and 678 and transfer gate 676 to a second input of NOR gate 668. The output of inverter 702 controls directly transfer gate 708 and through gated inverter 704 transfer gate 706. The gate input of inverter 704 is derived from the output of NOR gate 692. Transfer gates 706 and 708 couple alternate $\phi_2$ clock pulses to different points of receive register 154 so as to shift the serially received data into the register.

The output of transfer gate 696 is also coupled to provide a second input to AND gate 656. The output of AND gate 656 provides a first input to NOR gate 654. The output of NOR gate 654 is coupled to a second input of NOR gate 652, while the output of NOR gate 652 is coupled to a second input of NOR gate 654. The output of NOR gate 652 comprises a FULL BIT DETECT signal. In a similar manner, the output of NOR gate 650 provides a second input to NOR gate 648, while the output of NOR gate 648 provides a second input to NOR gate 650. The output of NOR gate 650 comprises a START BIT DETECT signal.

Operationally, the presence of a high level RESET signal initializes the system by causing the output of NOR gates 624 and 692 to go low. In each of the five pairs of NOR gates of FIG. 8, this has the effect of setting the outputs of the following NOR gates low while in each case the complementary NOR gate has a high level output; NOR gate 618, NOR gate 644, NOR gate 670, NOR gate 650, and NOR gate 652. In addition, the output of NAND gate 684 is set high so as to inhibit counting by counter 690. When no data is being received, the logic level of serial input line 128 is high with the result that the output of inverter 612 is also high and the output of NOR gate 618 remains low. Thus, under these conditions the counter 690 continues to be inhibited. At the same time, the low level signal appearing at the output of transfer gate 610 and the low level signal appearing at the output of NOR gate 644 result in a high level signal from the output of NOR gate 622. This causes a low level at the output of NOR gate 624, and a high level at the output of inverter 626 which is ultimately propagated to an input of NOR gate 644. Each incoming 8-bit character on line 128 is preceded by a low level start bit. When a character arrives, the one-to-zero transition on line 128 causes a zero-to-one transition at the input of NOR gate 622 and the output of this NOR gate goes low. This causes the output of NOR gate 624 to go high, and the resultant low level at the output of inverter 626 conditions NOR gate 618 to go high when the output of NOR gate 616 goes low. Similarly, the low level at the output of inverter 626 is propagated to an input of NOR gate 644 and conditions this NOR gate to go high when the output of NOR gate 646 goes low. The one-to-zero transition on line 128 is also propagated to the output of inverter 612, thereby causing NOR gate 614 to go high, and this in turn causes the output of NOR gate 616 to go low, while the output of NOR gate 618 goes high. The high level at the output of NOR gate 618 causes the output of NAND gate 684 to go low, and the next $\phi_1$ clock pulse clocks this low level through transfer gate 688, thereby freeing counter 690 to begin counting. Counter 690 then counts for a time equal to one-half the period of a bit in the incoming character. At the expiration of this time, the logic level on line 687 goes low. The operation of the remainder of the circuit of FIG. 8 in timing an incoming character may be better understood with the aid of the timing diagram of FIG. 10.

Figure 10:
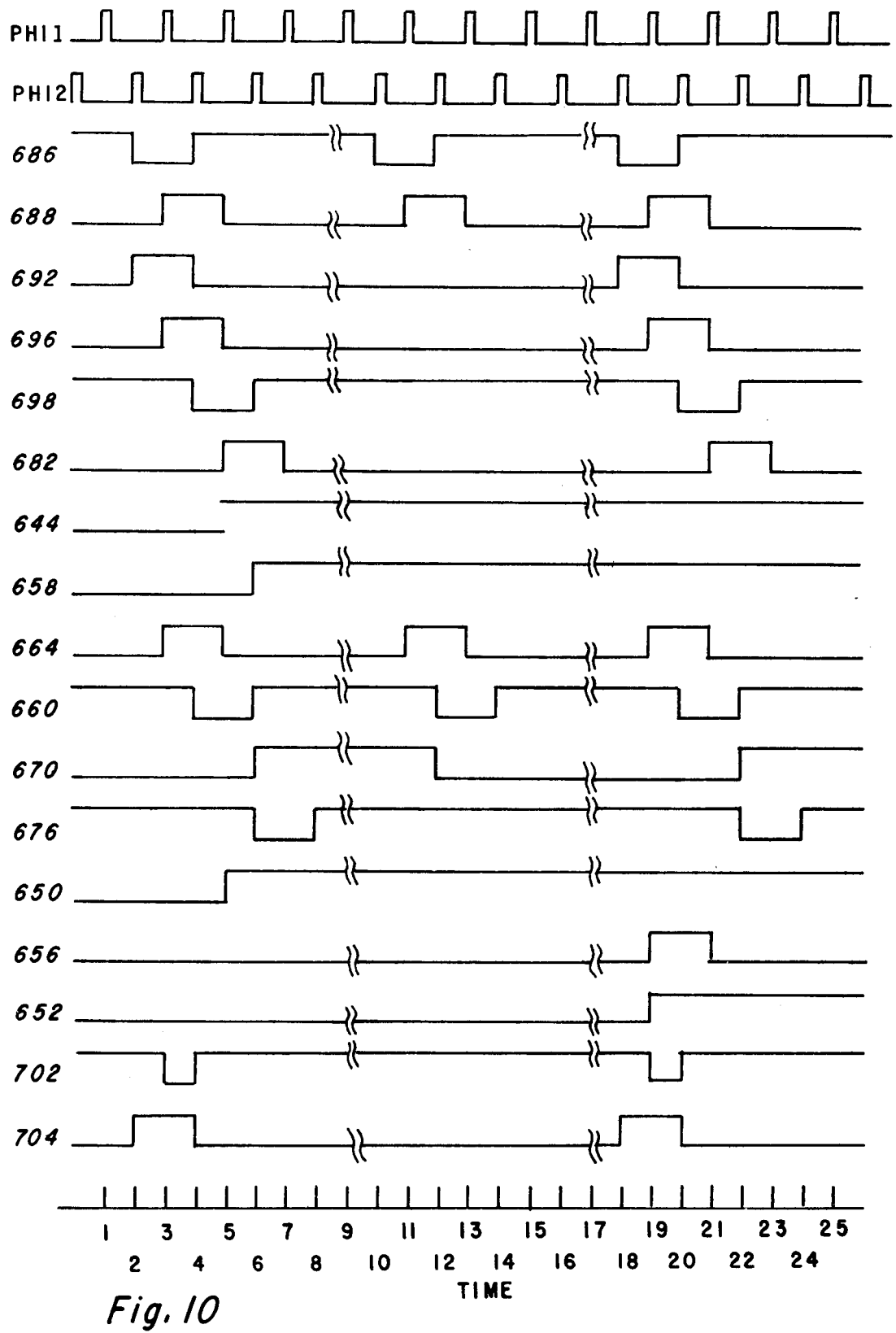
FIG. 10 is a timing diagram for the circuit of FIG. 8.

In FIG. 10, the various logic waveforms are those existing at the output of the devices denoted by the reference designators appearing at the left of each waveform. Thus, the third waveform which is associated with reference designator 686, is the logic waveform appearing at the output of transfer gate 686. The arbitrary time scale at the bottom of FIG. 10 is provided for convenience in referring to the logic waveforms. When counter 690 has completed a half-bit count and the logic level on line 687 goes low, the next $\phi_2$ pulse clocks this low level through transfer gate 686 as indicated at time 2. This causes the output of AND gate 684 to go high and the next succeeding $\phi_1$ pulse clocks this high level through transfer gate 688 to zero counter 690 and inhibit further counting. At this point, the logic level on line 687 returns high and the next $\phi_2$ pulse clocks this high level through transfer gate 686 at time 4 to an input of NAND gate 684. As a result, the output of NAND gate 684 returns low and the next $\phi_1$ pulse clocks this low level through transfer gate 688 at time 5 to free counter 690 to again begin counting.

Since both the RESET signal and the logic level at the output of NOR gate 670 are low at this point in time, the one-to-zero transition at the output of transfer gate 686 at time 2 causes the output of NOR gate 692 to go high. NOR gate 692 remains high until the output of transfer gate 686 goes high at time 4, at which time the output of NOR gate 692 returns low. Succeeding clock pulses clock this positive pulse from NOR gate 692 through transfer gates 696, 698 and 682 so as to cause a positive pulse at the output of transfer gate 682 between times 5 and 7. The high level at time 5 causes NOR gate 646 to go low and the output of NOR gate 644 goes high as illustrated in the waveform with reference designator 644. The next $\phi_2$ clock pulse clocks this high level through transfer gate 658 so as to enable NAND gate 672 for the next zero-to-one transition on its other input.

The low level pulse at the output of transfer gate 686 between times 2 and 4 is inverted by inverter 666 and clocked by the $\phi_1$ pulses so as to cause a positive going pulse at the output of transfer gate 664 between times 3 and 5. This is inverted by inverter 662 and clocked by the $\phi_2$ clock pulses so as to cause a negative going pulse at the output of transfer gate 660 between times 4 and 6. The positive going transitions in the 658 and 660 waveforms at time 6 cause the output of NAND gate 672 to go low. The positive going pulse at the output of transfer gate 682 between times 5 and 7 is inverted by inverter 674 and clocked by the $\phi_2$ clock so as to cause a negative going pulse in the output of transfer gate 676 between times 6 and 8. This negative going pulse is inverted by inverter 678 and causes the output of NOR gate 668 to go low at time 6. The consequent low level to one input of NOR gate 670 coupled with the low level which occurs at the output of NAND gate 672 at time 6 cause the output of NOR gate 670 to go high as illustrated.

The zero-to-one transition which occurs at the output of NOR gate 644 at time 5 causes the output of NOR gate 648 to go low and the output of NOR gate 650 to go high at time 5. This zero-to-one transition at the output of NOR gate 650 comprises a START BIT DETECT signal which may be read by the microprocessor as part of the controller status.

The low level pulse at the output of transfer gate 686 enables gated inverter 702 and the high level at the output of transfer gate 696 between times 3 and 4 causes the output of inverter 702 to go low from time 3 to time 4. This has the effect of turning off transfer gate 708 and disabling the $\phi_2$ clock pulse from the $\overline{\text{THI 1}}$ output. The $\overline{\text{THI 1}}$ output is connected to receive register 154 of FIG. 7 and the $\phi_2$ pulses which normally occur are used to periodically refresh the data in the receive register. This refreshing action is interrupted briefly between times 3 and 4 to permit shifting the start bit into the register. The high level pulse at the output of NOR gate 692 between times 2 and 4 causes the output inverter 704 to go high between times 2 and 4. At other times, the output of inverter 704 is held low by the high level which normally occurs at the output of inverter 702. The high level at the output of inverter 704 between times 2 and 4 enables transfer gate 706 to pass one pulse of the $\phi_2$ clock to the THI 1 terminal. This terminal is coupled to receive register 154 and clocks the start bit into the receive register.

The circuit then continues to function without change of state until counter 690 has counted through a time equal to one-half the period of a bit. When this time has expired, the logic level on line 687 again goes low and subsequent clock pulses cause the transitions in waveforms 686 and 688 between times 10 and 13 in the manner previously described. In this case, however, the high level at the output of NOR gate 670 holds the output of NOR gate 692 low and there are no transitions in the waveforms 696, 698, 682, 644 and 658. The negative going pulse on transfer gate 686 between times 10 and 12, however, is propagated through transfer gates 664 and 660 in the manner previously described so as to result in a negative going pulse between times 12 and 14 at one input of NAND gate 672. This causes the output of NAND gate 672 to go high and the output of NOR gate 670 to go low at time 12. At time 12, however, the output of transfer gate 686 has returned high so that the output of NOR gate 692 remains low.

The circuit then continues without change of state until counter 690 has again counted through a time equal to one-half a bit period. This results in transitions in the logic waveforms as illustrated and as in the manner previously described. In this case, however, when the positive pulse occurs at the output of transfer gate 696 between times 19 and 21, the output of NOR gate 644 is high. The two high level inputs to AND gate 656 between times 19 and 21 therefore cause its output to go high, thereby switching the output of NOR gate 654 low and the output of NOR gate 650 to go high. The zero-to-one transition in the output of NOR gate 652 at time 19 comprises a FULL BIT DETECT signal which may be read by the microprocessor as part of the controller status. Again at this point, the $\phi_2$ pulses at the $\overline{\text{THI 1}}$ terminal are briefly inhibited and a $\phi_2$ pulse is clocked to the $\overline{\text{THI 1}}$ terminal to shift the start bit one position in receive register 154 and to clock the first data bit into the receive register. This mode of operation then continues until the entire incoming word has been clocked into the receive register.

If, during the first half of the start bit, the signal level on serial input line 128 should go high, indicating a false start bit, the resultant low logic level at the output of transfer gate 610 and the low level at that point in the sequence at the output of NOR gate 644 will cause the output of NOR gate 622 to go high. There results a high logic level at the output of inverter 626 which in turn forces the output of NOR gate 618 low. This causes a high logic level at the output of NAND gate 684 which is clocked through transfer gate 688 by the next $\phi_1$ pulse to zero counter 690 and inhibit counting. Thus, a start bit which does not last for a time equal to one-half bit period will cause the circuit to reset itself and await the occurrence of the next one-to-zero transition at serial input line 128. In summary, the function of the receive register 154, receive buffer 158, and associated control circuit is to synchronize with the incoming serial data at the selected baud rate to provide bit to bit timing for input to the 8-bit character buffer.

When a one-to-zero transition is detected on the serial input line, the counter is incremented until the middle of the start bit is detected. After the start bit is detected, the counter times full bit times by cycling through its count period twice. When a bit is detected, the data in the shift register is shifted one position and the new bit clocked into the shift register. When a full character has been received, it is transferred from the receive register to the receive buffer register from which it is gated to the data bus when a read receive buffer register function is addressed by the microprocessor unit.

TRANSMITTER

Figure 11:
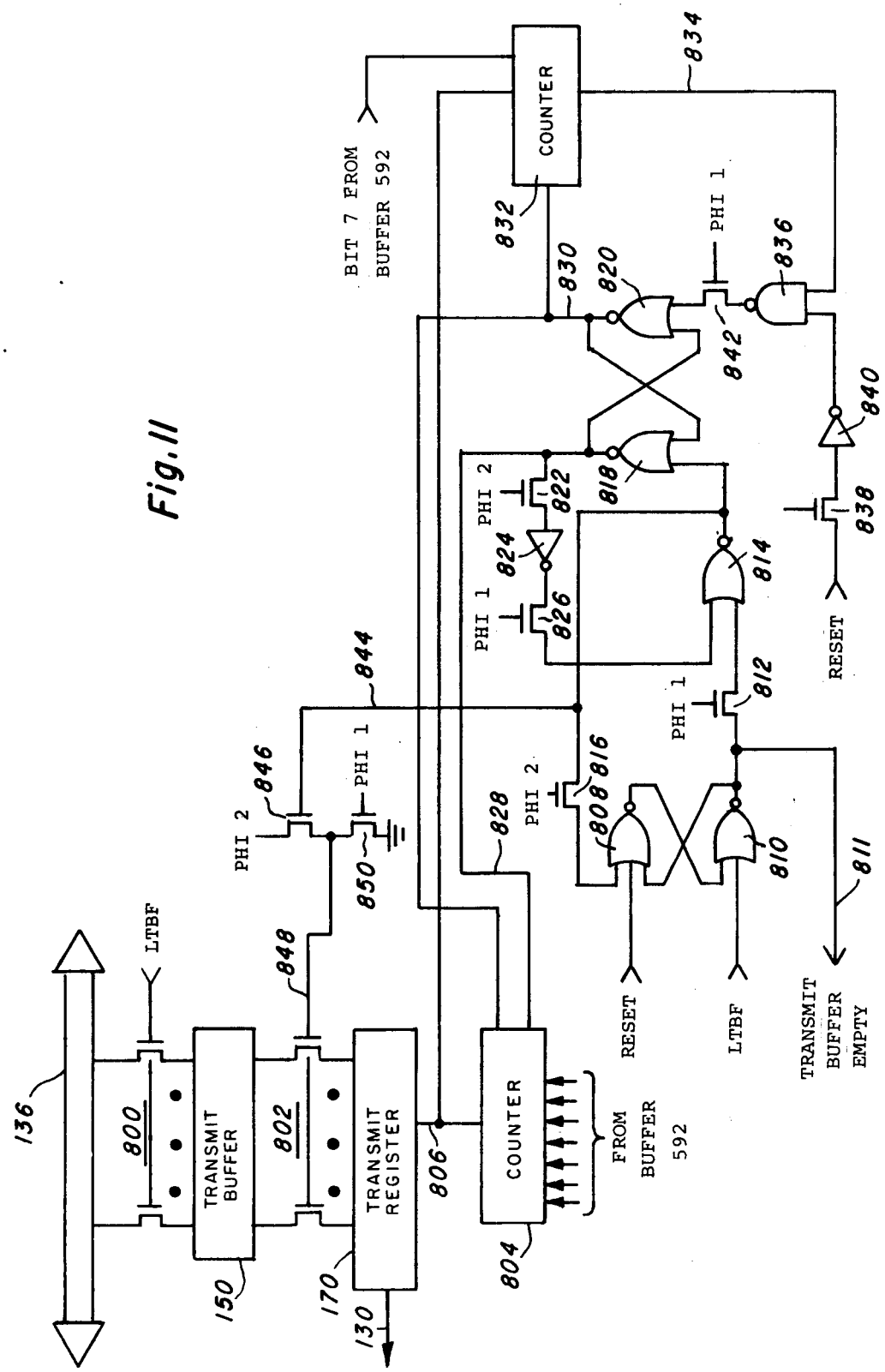
FIG. 11 is a schematic diagram of the serial transmit circuit.

The transmit buffer, transmit register, and the associated control circuits are illustrated in FIG. 11. Eight bit characters from the controller data bus 136 are selectively coupled to transmit buffer 150 by a plurality of transfer gates 800. A high level load transmit buffer (LTBF) signal generated by the microprocessor causes a character to be transferred to the transmit buffer. The character is transmitted from the buffer to transmit register 170 by means of a plurality of transfer gates 802. Data in transmit register 170 is shifted out serially onto the transmit data line 130. A counter 804 is coupled to transmit register 170 by means of line 806. Signals provided by counter 804 on line 806 shift the character in the register out bit by bit on line 130. Seven input signals from buffer 592 of FIG. 7 provide counter 804 with the baud rate selected by the microprocessor (any one of seven baud rates ranging from 110 baud to 9600 baud). With reference to the control circuits, a NOR gate 808 has as a first input the system RESET signal. The output of NOR gate 808 is coupled to one input of NOR gate 810, the output of which provides a second input to NOR gate 808. The second input of NOR gate 810 is the aforementioned LTBF signal. The output of NOR gate 810 is coupled through transfer gate 812 under control of the $\phi_1$ signal to a first input of NOR gate 814. The output of NOR gate 814 is coupled through transfer gate 816 under control of the $\phi_2$ signal to provide a third input to NOR gate 808. The output of NOR gate 814 is also coupled to a first input of NOR gate 818. The output of NOR gate 818 is coupled to a first input of NOR gate 820, the output of which is coupled back to the second input of NOR gate 818. The output of NOR gate 818 is also coupled through transfer gate 822 under control of the $\phi_2$ signal, through inverter 824, and through transfer gate 826 under control of the $\phi_1$ signal back to the second input of NOR gate 814. The output of NOR gate 818 is also coupled by line 828 to provide an inhibit signal to counter 804. This inhibit signal, when at a high logic level, prevents counter 804 from generating a shift signal on line 806. The output of NAND gate 820 is coupled by line 830 to a second counter 832. Counter 832 counts shift pulses generated by counter 804 on line 806. Counter 832 is reset and inhibited from counting by low level signals appearing on line 830. Counter 832 counts either 10 or 11 of the shift pulses in accordance with the logic level of bit 7 of buffer 592. This bit position is set ultimately by the microprocessor in accordance with whether one or two stop bits are to be sent with each data character. When the appropriate count is reached (10 or 11), counter 832 generates a low level logic signal on line 834 which is coupled to a first input on NAND gate 836. The system RESET signal is coupled through transfer gate 838 under control of the $\phi_2$ signal and through inverter 840 to the second input of NAND gate 836. The output of NAND gate 836 is coupled by transfer gate 842 under control of the $\phi_1$ signal to a second input of NOR gate 820. The output of NOR gate 820 is also coupled by line 830 to counter 804 and serves to reset and inhibit counter 804 when in the low logic state. The output of NOR gate 814 is also coupled by line 844 to control transfer gate 846. Transfer gate 846, when energized, couples a $\phi_2$ pulse to line 848 to cause transfer gates 802 to transfer a data character from transmit buffer 150 to transmit register 170. When transfer gate 846 is not energized, $\phi_1$ pulses control transfer gate 850 to hold line 848 at ground potential so as to prevent the inadvertent transfer of data between the transmit buffer and the transmit register.

Figure 12:
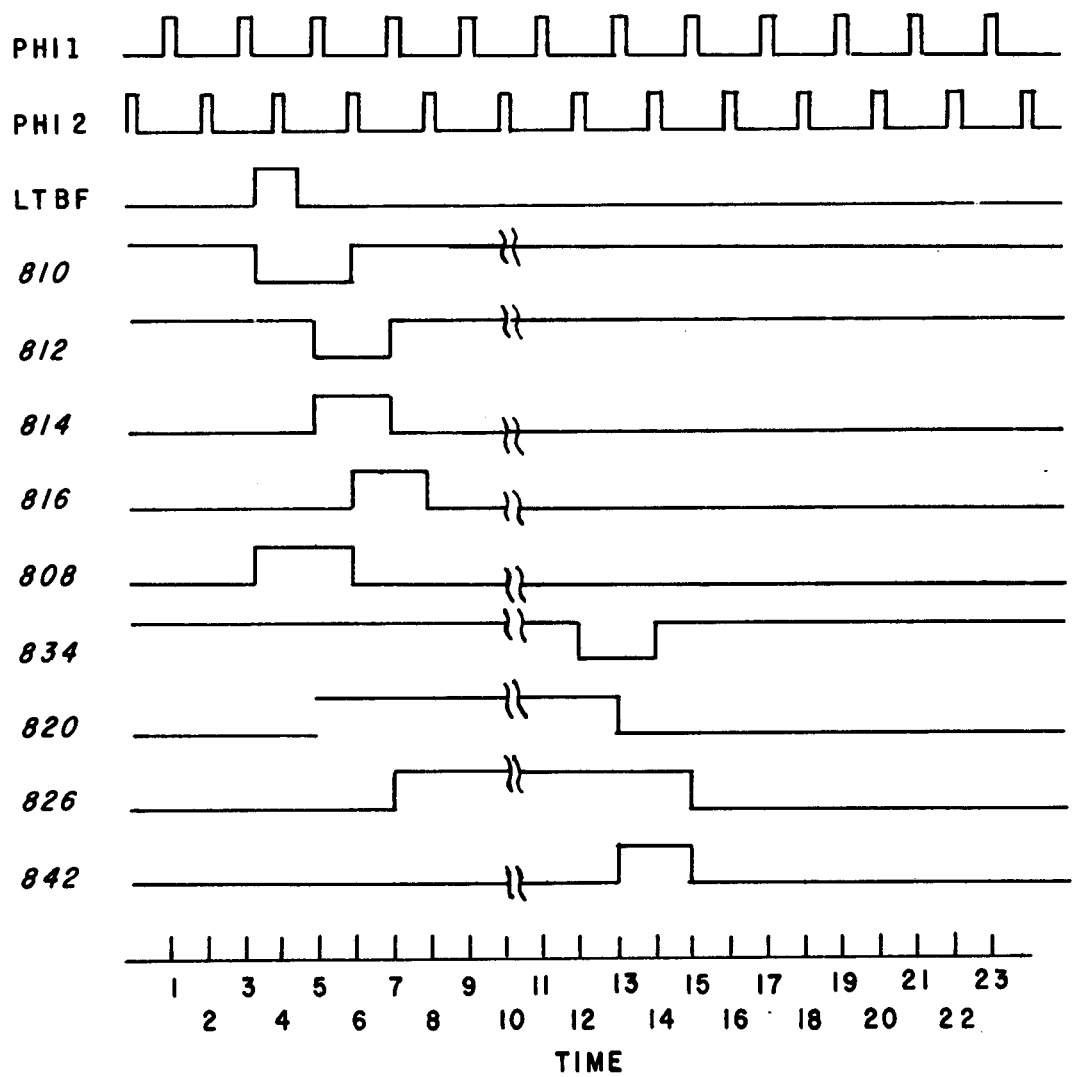
FIG. 12 is a timing diagram for the serial transmit circuit.

The operation of the transmitter circuitry may be explained with the aid of the logic waveforms of FIG. 12. As in the case of FIG. 10, the various waveforms shown are the outputs of the devices denoted by the reference designators associated with the traces. Also again, the time scale at the bottom of FIG. 12 is arbitrarily selected for convenience in describing the figure. It is assumed that at time 1, a system RESET has occurred and as a result the various devices have the output levels shown. Between times 3 and 4, an LTBF high level signal occurs. This has the effect of transferring a character from data bus 136 through transfer gate 800 into transmit buffer 150. Also, the high level LTBF signal causes the output of NOR gate 810 to go low, while the output of NOR gate 808 goes high. The low level signal on line 811 indicates, as part of the controller status, that the transmit buffer at this point in time is full and not ready to accept another character. The next $\phi_1$ pulse transfers the negative going pulse at the output of NOR gate 810 to an input of NOR gate 814 and causes a positive pulse at the output of NOR gate 814. This positive pulse is coupled through line 844 to transfer gate 846 such that the next $\phi_2$ pulse is coupled through line 848 and causes transfer gates 802 to shift the character from transmit buffer 150 to transmit register 170. The positive output of NOR gate 814 is also coupled by the next $\phi_2$ pulse through transfer gate 816 and causes the output of NOR gate 808 to return to the low logic level at time 6. This causes the output of NOR gate 810 to return high, and after subsequent $\phi_1$ and $\phi_2$ pulses, the outputs of devices 812, 814 and 816 return to their original logic levels in preparation for the next LTBF signal.

The transition which occurs at the output of NOR gate 814 at time 5 also has the effect of causing the output of NOR gate 818 to go low and the output of NOR gate 820 to go high. The low level signal from NOR gate 818 on line 828 frees counter 804 and permits the generation of shift signals on line 806. Similarly, the high level signal from NOR gate 820 on line 830 permits both counters 804 and 832 to begin counting. The low level signal at the output of NOR gate 818 is coupled by the next successive $\phi_2$ and $\phi_1$ pulses through transfer gates 822 and 826 and inverter 824 to provide a high level input to one side of NOR gate 814. The control circuits then remain in the state illustrated at time 9 while the data word is shifted out of transmit register 170 under control of counter 804. This continues until counter 832 counts the designated number of shift pulses (10 or 11), at which time the logic level on line 834 goes low as illustrated at time 12. The consequent high logic level at the output of NAND gate 836 is coupled by the next $\phi_1$ pulse through transfer gate 842 as illustrated at time 13. This causes the output of NOR gate 820 to go low and the output of NOR gate 818 to go high. The low level signal appearing on line 830 resets and inhibits both counters 804 and 832. At the same time, the high level signal appearing on line 828 prevents counter 804 from generating shift signals on line 806. With counter 832 zeroed, the next $\phi_2$ pulse causes the logic level on line 834 to return high, thereby causing a low level at the output of NAND gate 836. At time 15, this low level is coupled to the output of transfer gate 842 by the $\phi_1$ pulse. At this point in time, all logic levels are returned to their original state in preparation for the next LTBF signal. It is possible for the microprocessor to cause a new character to be loaded from bus 136 into transmit buffer 150, even though the previous character has not been completely transmitted from transmit register 170 (at time 9 in FIG. 12, for example). The new LTBF signal will shift the new character into transmit buffer 150 and will cause the output of NOR gate 810 to go low so that the low level signal appearing on line 811 indicates a transmit buffer full status. In this case, however, the high level signal at the output of transfer gate 826 prevents coupling the high-to-low transition at the output of NOR gate 810 through NOR gate 814. The new character is held in transmit buffer 150 until the previous character has been completely transferred out of transmit register 170 and the signal at the output of transfer gate 826 goes low as illustrated at time 15. This permits the output of NOR gate 814 to go high and the new character is shifted into transmit register 170 and shifted out onto line 130 bit by bit in the manner previously illustrated.

OUTPUT REGISTER

Figure 13:
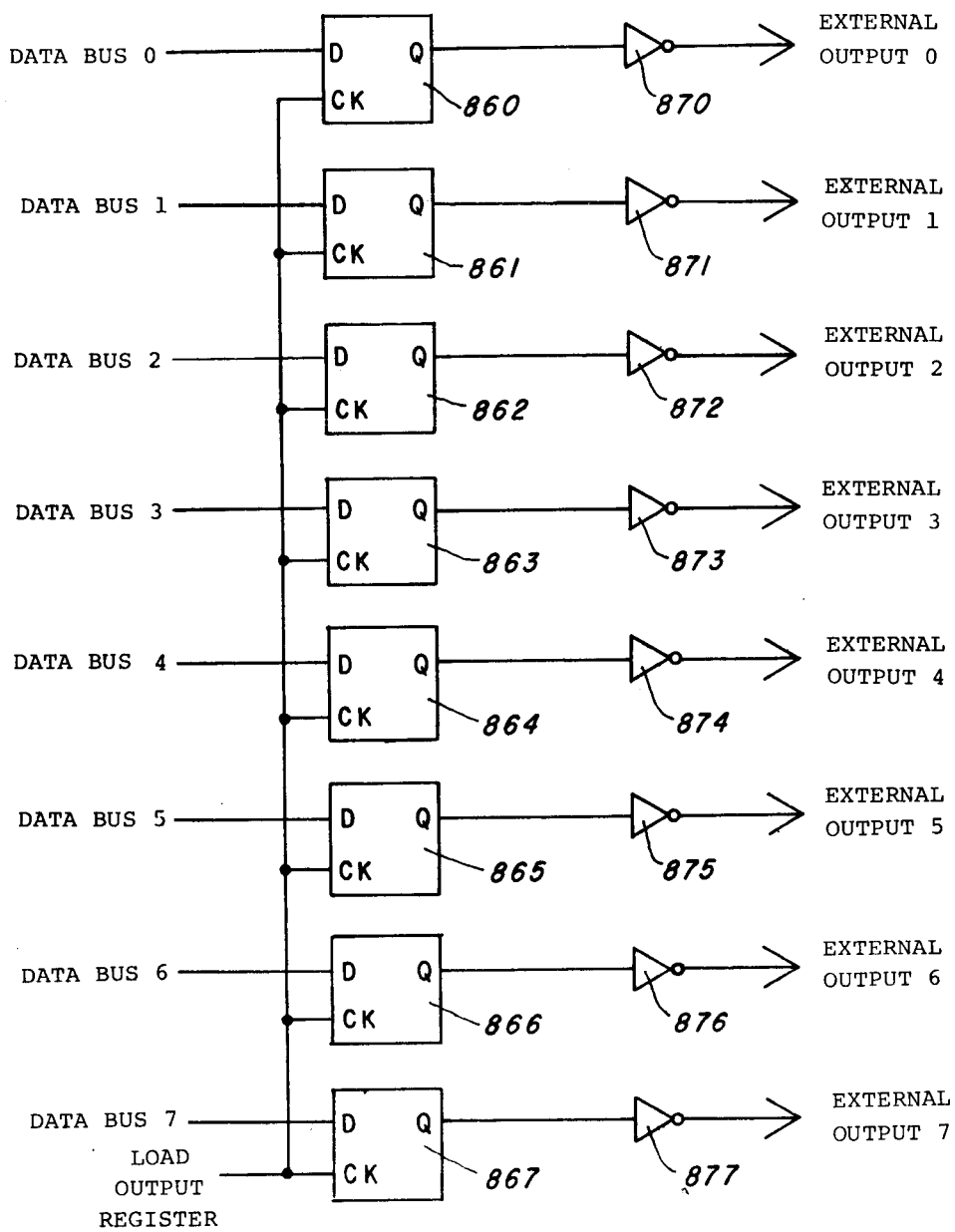
FIG. 13 shows the configuration of the parallel output register.

Output register 172 of FIG. 1 is illustrated in greater detail in FIG. 13. The register comprises a plurality of D flip-flops 860 through 867, one for each of the eight bits of a character. Each of the eight bits on internal data bus 136 is coupled to a D input of one of the flip-flops. The Q outputs of the flip-flops are each coupled through one of inverters 870 through 877 to provide the eight bits on the external output bus. A load output register command is coupled to the clock inputs of flip-flops 860 through 867 and, when in the high state, serves to transfer the data from the D inputs of the flip-flops to the Q outputs.

External Inputs

Input buffer 174 simply comprises a set of eight gates, one coupled in each of the eight lines of external input bus 124. Upon receipt of a read external input command, the eight bits of data are gated from external input bus 124 to controller data bus 136.

Status

Status register 178 of FIG. 1 is illustrated in greater detail in FIG. 14. Each of the various bits of status information are coupled as shown to one of transfer gates 880 through 887. In each case, if the status bit is high, the corresponding transfer gate is closed so as to couple the high level $V_{CC}$ signal through the transfer gate. The outputs of transfer gates 880 through 887 are coupled through transfer gates 890 through 897 to the controller data bus 136. When a read status command (RDST) goes high, transfer gates 890 through 897 are enabled to couple the status bits to the data bus.

The input/output controller communicates with the microprocessor unit via the four least significant bits of the address bus, a chip select line, the 8-bit bidirectional data bus, the interrupt line, and a SYNC line. A high level chip select signal indicates that the device is being addressed by the microprocessor unit and that the address lines are to be decoded to determine what function is to be performed. The specific nature of the decoding is set forth in Table II.

TABLE II

| ADDRESS $A_3A_2A_1A_0$ | COMMAND/FUNCTION |
|---|---|
| 0 0 0 0 | Read Receive Buffer Register |
| 0 0 0 1 | Read External Input Lines |
| 0 0 1 0 | Read RST ROM |
| 0 0 1 1 | Read I/O Status |
| 0 1 0 0 | Discrete Commands |
| 0 1 0 1 | Load Rate Command Register |
| 0 1 1 0 | Load Transmit Buffer Register |
| 0 1 1 1 | Load Output Register |
| 1 0 0 0 | Load Interrupt Mask Register |
| 1 0 0 1 | Load Timer 1 |
| 1 0 1 0 | Load Timer 2 |
| 1 0 1 1 | Load Timer 3 |
| 1 1 0 0 | Load Timer 4 |
| 1 1 0 1 | Load Timer 5 |

Thus, if all four of bits $A_0$ through $A_3$ of the address bus are zero, the controller interprets this as a Read Receive Buffer Register command and generates a high level signal at the RRB input of FIG. 7.

The SYNC signal is issued by the microprocessor unit and indicates the beginning of a machine cycle and availability of machine status. When the SYNC signal is a logic one, the input/output controller monitors data bus bit $D_0$. An interrupt acknowledge from the microprocessor unit is indicated when $D_0$ is a logic one during SYNC. The controller gates this decode with the interrupt acknowledge enable signal before taking action.

A logic one on the interrupt output signal line indicates that at least one of the interrupt conditions has occurred and that its corresponding mask register bit is a logic one.

It will be noted from Table II that a binary four in address $A_0$ through $A_3$ designates a discrete commands function command (DISCOM). When this function is addressed, the controller interprets the information on the data bus as follows: If bit 0 is a logic one the RESET signal which appears in various points in the drawings is set high so as to reset the input/output controller. If bit 2 is a logic one, the seventh interrupt is generated by a zero-to-one transition in external input bit 7. This selection is accomplished as set forth in the previous discussion of FIG. 6. If bit 3 is a logic one, the input/output controller accepts the interrupt acknowledge signal transmitted on bit 0 of the data bus during SYNC.

There has been disclosed an input/output controller for use in conjunction with a microprocessor. The controller provides a number of special purpose functions which are either not provided in microprocessors or require too much of the microprocessor's available time. In the preferred embodiment, the controller includes an 8-bit output register, eight input lines with an independent sensor, a maskable interrupt register, five interval timers, a serial data receiver, a serial data transmitter, a selectable baud rate generator, and interrupt priority gating.

While the controller has been disclosed in its preferred embodiment, there may be suggested to those skilled in the art certain minor modifications which do not depart from the spirit and scope of the invention as set forth in the following claims.

What is claimed is:

1. An input/output controller for use with a microprocessor unit comprising in combination on a single semiconductor chip:
   (a) an input/output bus connected to the microprocessor unit,
   (b) means for coupling a flow of one or more data words on the input/output bus from the microprocessor unit, and to and from external units;
   (c) at least one interval timer connected to the input/output bus, addressable by a data word from the microprocessor unit to time a selectable period;
   (d) means for generating interrupt signals, connected to the input/output bus and to the interval timer for transmission to the microprocessor unit to selectively interrupt the flow of one or more data words, including means for generating an interrupt signal upon the expiration of the selectable period and in response to external signals; and
   (e) means for masking said interrupt signals, connected to the microprocessor unit and to the means for generating interrupt signals to mask the interrupt signals, in accordance with instructions in the form of data words received from the microprocessor unit to permit the flow of one or more data words.

2. The controller of claim 1 wherein the generating means further includes means for prioritizing said interrupt signals connected and responsive to the masking means for generating one of a plurality of interrupt signals.

3. The controller of claim 1 wherein the coupling means comprises means for coupling the flow of one or more data words on the input/output bus in serial manner to and from external devices in response to said interrupt signals.

4. The controller of claim 3 wherein said interrupt signals are vectored interrupt signals.

5. The controller of claim 3 wherein said interrupt generating means generates interrupt signals to indicate that said means for coupling the flow of one or more data words in serial manner is ready to accept a new character from the input/output bus or has received a character from an external device and is ready to load said character onto the input/output bus.

6. The controller of claim 3 further comprising a detector connected to the generating means and to an external sensor for causing the generation of an interrupt signal when the signal provided by the external sensor undergoes a predetermined transition.

7. The controller of claim 3 wherein said interrupt generating means provides a logic level change on an interrupt line to signal to the microprocessor unit dependency of at least one interrupt signal, and upon command from said microprocessor unit loads a unique address onto the input/output bus.

8. The controller of claim 3 wherein the interrupt generating means further comprises means for communicating coexisting interrupt signals to said microprocessor unit in a predetermined order.

9. The controller of claim 3 further comprising means responsive to commands from said microprocessor unit to load controller status information onto the input/output bus.

10. The controller of claim 1 further comprising a transition sensor connected to the generating means and to the coupling means for causing the generation of an interrupt signal upon a predetermined logic level change in state in one of the bits of an incoming parallel word.

* * * * *

UNITED STATES PATENT AND TRADEMARK OFFICE
CERTIFICATE OF CORRECTION

PATENT NO. : 4,159,516
DATED : June 26, 1979
INVENTOR(S) : W. S. Henrion et al

It is certified that error appears in the above–identified patent and that said Letters Patent are hereby corrected as shown below:

Under "Abstract", "numer" should be --number--.
Col. 1, line 45, "pluraity" should be --plurality--.
line 65, "is" should be --of--.

Col. 4, second line of table, "ROMAD0" should be --ROMAD1--.
Col. 8, line 34, "$100_1$" should be --$\emptyset_1$--.
Col. 12, line 29, after "input is" insert --in--.
Col. 13, line 58, delete "is" (second occurrence).
Col. 14, line 56, "invertr" should be --inverter--.
Col. 15, line 38, $\emptyset_1$ (second occurrence) should be --$\emptyset_2$--.

Signed and Sealed this

Twentieth Day of January 1981

[SEAL]

Attest:

RENE D. TEGTMEYER

Attesting Officer   Acting Commissioner of Patents and Trademarks